United States Patent
Seguchi et al.

(10) Patent No.: US 7,358,698 B2
(45) Date of Patent: Apr. 15, 2008

(54) FIELD-WINDING TYPE OF SYNCHRONOUS MACHINE

(75) Inventors: Masahiro Seguchi, Oobu (JP); Yurio Nomura, Nagoya (JP); Hiroya Tsuji, Yokkaichi (JP)

(73) Assignee: Denso Corporation, Kariya, Aichi-pref. (JP)

( * ) Notice: Subject to any disclaimer, the term of this patent is extended or adjusted under 35 U.S.C. 154(b) by 11 days.

(21) Appl. No.: 11/476,200

(22) Filed: Jun. 28, 2006

(65) Prior Publication Data

US 2006/0290316 A1    Dec. 28, 2006

(30) Foreign Application Priority Data

| Jun. 28, 2005 | (JP) | ............................. 2005-188184 |
| Nov. 24, 2005 | (JP) | ............................. 2005-338842 |
| Dec. 7, 2005 | (JP) | ............................. 2005-353890 |
| May 17, 2006 | (JP) | ............................. 2006-137929 |

(51) Int. Cl.
*H02P 6/10* (2006.01)
*H02P 7/298* (2006.01)
*H02P 27/08* (2006.01)

(52) U.S. Cl. ...................... 318/700; 318/712; 318/719; 318/720; 318/721; 318/523; 310/180

(58) Field of Classification Search ............... 318/521, 318/523, 528, 700, 712, 714, 716, 719, 720–724; 310/180–184, 134–144
See application file for complete search history.

(56) References Cited

U.S. PATENT DOCUMENTS 4,240,020 A * 12/1980 Okuyama et al. ........... 318/721

4,670,696 A * 6/1987 Byrne et al. ................ 318/701

(Continued)

FOREIGN PATENT DOCUMENTS

JP    S58-063057    4/1983

(Continued)

OTHER PUBLICATIONS

"Characteristics Analysis of Half-Wave Rectified Brushless Synchronous Motor withPermanent Magnets" by J. Oyama et al.: T.IEE Japan, vol. 113-D, No. 2, '93: pp. 238-246 (w/ partial English translation).

*Primary Examiner*—Lincoln Donovan
*Assistant Examiner*—Eduardo Colon
(74) *Attorney, Agent, or Firm*—Nixon & Vanderhye P.C.

(57) ABSTRACT

A field-winding type of synchronous machine comprises a stator with an armature winding wound phase by phase, a rotor having a rotor core with a field winding wound, and a circuit enabling an armature current to pass the armature winding, the armature current corresponding to a synchronous current producing a rotation field rotating at an electrical-angle rotation speed agreeing to a rotation speed of the rotor. The synchronous machine further comprises a current suppressor and a current supplier. The current suppressor is connected to the field winging and suppresses, into a unidirectional current, an induced alternating current induced through the field winding in response to the armature current passing the armature winding. The current supplier supplies, phase by phase, to the armature winding a rotor exciting current whose waveform is different from the synchronous current only during a predetermined period of time shorter than one cycle of the synchronous current.

35 Claims, 23 Drawing Sheets

U.S. PATENT DOCUMENTS

| | | | |
|---|---|---|---|
| 5,668,458 A * | 9/1997 | Ueda et al. | 318/716 |
| 5,811,905 A * | 9/1998 | Tang | 310/179 |
| 5,929,590 A * | 7/1999 | Tang | 318/701 |
| 2002/0074803 A1* | 6/2002 | Kajiura | 290/40 F |
| 2005/0212476 A1* | 9/2005 | Satake et al. | 318/720 |
| 2006/0197396 A1* | 9/2006 | Pollock et al. | 310/166 |

FOREIGN PATENT DOCUMENTS

| | | |
|---|---|---|
| JP | H07-095790 | 4/1995 |
| JP | H10-271781 | 10/1998 |
| JP | 2005-117843 | 4/2005 |
| JP | 2005-210811 | 8/2005 |

* cited by examiner

FIELD-WINDING TYPE OF SYNCHRONOUS MACHINE

CROSS-REFERENCE TO RELATED APPLICATIONS

This application is based on and claims the benefit of priorities from earlier Japanese Patent Application No. 2005-188184 filed on Jun. 28, 2005, Japanese Patent Application No. 2005-338842 filed on Nov. 24, 2005, Japanese Patent Application No. 2005-353890 filed on Dec. 7, 2005 and Japanese Patent Application No. 2006-137929 filed on May 17, 2006 the descriptions of which are incorporated herein by reference.

BACKGROUND OF THE INVENTION

1. Technical Field of the Invention

The present invention relates to a field-winding type of synchronous machine, and more particularly relates to an improvement of a structure for supplying electric power to a rotor winding (hereinafter also referred to as a field winding or a short-circuit winding) in a rotor-winding synchronous machine in which DC current is passed through a rotor.

2. Related Art

A rotary electric machine whose rotor rotates in synchronization with a rotating field that has been produced by an armature current, i.e., an AC current flowing through a stator winding, is called a synchronous machine. Known synchronous machines include those having a rotor structure of magnet type, field-winding type, reluctance type, and a type in which the foregoing types are mixed.

The field-winding type of synchronous machines exert excellent practical utility in speed-variable type rotary electric machines used, for example, for generating power for automotive performances, in that there is no need to place expensive permanent magnets in a rotor core, there is no need to consider resistance to centrifugal force of the magnets, and torque and generated (induced) voltage can be freely controlled by field flux control.

Japanese Unexamined Patent Application Publication No. 07-095790, for example, suggests a field-winding type of synchronous machine, which has a structure with no brush, and facilitates torque control.

However, the field-winding type of synchronous machine disclosed in the above publication is one in which a multiphase AC current which is in synchronization with a rotor position and is amplitude-modulated by modulated waveforms at bias frequency, is supplied to a stator winding. Thus, a current having large ripple flows through a rotor field winding, raising a problem of producing large torque ripple.

SUMMARY OF THE INVENTION

The present invention has been made in light of the above problem, and has an object of providing a field-winding type of synchronous machine of which torque ripple is small.

The present invention for resolving the problem described above is applied to a field-winding type of synchronous machine comprising: a stator on which an armature winding is wound phase by phase; a rotor having a rotor core on which a field winding is fixedly wound and being located to be opposed to the stator for rotation; and a circuit configured to enable an armature current to pass the armature winding, the armature current corresponding to a synchronous current producing a rotation field rotating at an electrical-angle rotation speed agreeing to a rotation speed of the rotor. In this field-winding type of synchronous machine, electric power is supplied from the stator to the field winding in a non-contact manner. As described above, the rotor may have permanent magnets for generating magnetic torque and a magnetic salient-pole structure for generating reluctance torque. Similarly to magnet type synchronous machines, the field-winding type of synchronous machine of the present invention can employ a reluctance motor imparted with magnetic resistance variation in its rotor core.

Characteristically, the field-winding type of synchronous machine according to the present invention further comprises a current suppressor connected to the field winging and configured to suppress, into a unidirectional current, an induced alternating current induced through the field winding in response to the armature current passing the armature winding; and a current supplier configured to supply, phase by phase, to the armature winding a rotor exciting current whose waveform is different from the synchronous current only during a predetermined period of time shorter than one cycle of the synchronous current to be supplied through the armature winding. Preferably, the current suppressor electrically connected in series to the field winging. Still preferably, the armature current has a fundamental wave component corresponding to the synchronous current.

Specifically, in the field winding of the field-winding type of synchronous machine according to the present invention, field current is unidirectionally supplied to the field winding on a priority basis by, for example, rectifying AC voltage which is induced to the field winding by the interlinkage of the flux formed by the armature current of the synchronous machine (armature current flux) with the field winding. Further, amounts of field flux can be controlled to readily control the torque or the generated voltage, by controlling armature current components (which is also referred to as a rotor exciting current) for inducing AC voltage to the field winding.

A rotor exciting current whose waveforms are different from those of a synchronizing current only during a predetermined period of time which is shorter than one cycle of the synchronizing current, is hereinafter may referred to as a pulsed high-frequency current. Advantages of a method for forming secondary excitation current are described below, which utilizes a technique for superimposing this pulsed high-frequency current.

In the method for forming an excitation current disclosed in Japanese Unexamined Patent Application Publication No. 07-095790 provided above is a method for forming a secondary excitation current using a technique for superimposing a pulsating excitation current. This method periodically fluctuates a primary excitation current which is superimposed on the armature current, so that the secondary excitation current, which is an excitation current induced to the rotor winding, is pulsated. Although an average effective value of the primary excitation current can be reduced by the periodical fluctuation of the primary excitation current, there has been a problem that the pulsation of the primary excitation current leads to the pulsation of the secondary excitation current, resultantly increasing the torque ripple, and thus increasing noise and vibration. On the other hand, when the primary excitation current is reduced in order to reduce the torque ripple due to the secondary excitation current, the secondary excitation current is also reduced, making the torque undesirably small.

Contrarily, in a method for forming excitation current by using the technique for superimposing the pulsed high-frequency current described above, a pulsed primary excitation current is supplied only during a short period of time of one cycle of fundamental wave components of a three-phase armature current. In this method, a pulsed large secondary excitation current can be supplied to the rotor winding, so that large torque can be obtained by the large secondary excitation current. Since the period for supplying the primary excitation current is short, possible occurrence of torque would be sporadic and last only for a short period of time, the torque ripple can be equivalently made small comparing with the case where high-frequency current is periodically superimposed (refer to Japanese Unexamined Patent Application Publication No. 07-095790). As a result, noise and vibration of a rotary electric machine can be remarkably reduced.

In the above embodiment, a pulsed voltage pair is formed for forming a pulsed primary excitation current by effecting PWM (pulse width modulation) control for forming a three-phase armature current having a sine-wave form. In other words, the primary excitation current and the fundamental wave components of the armature current are formed in a common circuit, and this can simplify the circuit arrangement.

In the excitation current supply system using a technique for superimposing pulsed current as described in this embodiment, the pulsed current has high-frequency components, and thus the degree of electromagnetic coupling between an armature winding and an excitation winding is enhanced. Accordingly, if a period for supplying current is short, excitation electric power can be efficiently supplied to the excitation winding through a magnetic gap. This allows the effective value of the torque ripple to be reduced in comparison with the excitation current supplied from an armature winding to an excitation winding, the excitation current having relatively lower frequency and lasting a longer period of time than a pulsed current, thereby providing an effect of reducing vibration and noise.

It should be noted that, as a technique for winding a field winding about a rotor core, various known techniques can be employed, such as concentrated winding and distributed winding. Further, a field-winding winding structure, such as a Lundell pole core may be used. As to the armature winding, various winding techniques, such as concentrated winding and distributed winding can also be used for winding a stator core.

In the current flowing through the armature winding (armature current), current components form a rotating field that rotates at a rotation speed which matches with that of a rotor (synchronizing current). Since the synchronizing current is a DC current for a field winding which is wound about the rotor that rotates at the same peripheral speed as the rotating field, no AC current is induced to the field winding.

Accordingly, components of the armature current for producing an induced AC current in the field winding (rotor exciting current) are required to cause flux variation in a relative manner with respect to the field winding whether the rotor is in motion or motionless. Flux variation is caused with respect to the field winding by forming the rotating field that rotates relative to the rotor, with the aid of the rotor exciting current, or by providing an AC current to the armature winding at a frequency different from a synchronizing frequency of the rotor. In other words, the rotor exciting current may form or not form the rotating field, but in case of forming the rotating field, a rotational angular speed of the rotating field is required not to match a rotor angular speed.

Individual phase windings constituting the armature winding are each wound about the teeth of the stator core in a predetermined order in a concentrated or distributed manner. Thus, in order to produce good AC voltage in the field winding, it is preferable to control the rotor exciting current according to a rotor angle. As is well known, in the case of a three-phase distributed winding, six armature conductors (also referred to as phase windings) which stand along the circumference in the order of a U-phase conductor, a minus (−) V-phase conductor, a W-phase conductor, a minus(−) U-phase conductor, a V-phase conductor and a minus(−) W-phase conductor, are arranged within an electrical angle $2\pi$, and a field pole (magnetic salient-pole) pitch of the rotor core is rendered to be an electrical angle $\pi$.

In case field poles confront a current field formed by the U-phase, minus V-phase and W-phase conductors, when the rotor exciting current is unidirectionally supplied to each of the U-phase and W-phase conductors, and the rotor exciting current is supplied, in an inverse direction, to the V-phase conductor, these three-phase rotor exciting currents unidirectionally form field-winding linkage flux. Frequency of the rotor exciting current of each of the phases should be a frequency different from the synchronizing frequency, or preferably, should be a frequency higher than the synchronizing frequency. On the other hand, in case the field poles confront a current field formed by the minus V-phase, W-phase and minus U-phase conductors, the rotor exciting current only has to be unidirectionally supplied to each of the U-phase and V-phase conductors, and the rotor exciting current only has to be supplied to the W-phase conductor in an inverse direction. Similarly, by determining the direction of the rotor exciting current which is supplied to each of the phase windings, the field formed by the rotor exciting current flowing through each phase winding can be efficiently interlinked with the field winding.

The field-winding type of synchronous machine of the present invention can also be used as a generator instead of a motor. In such a case, the rotor exciting current can be formed using the generated power. When a synchronous machine is operated in a power generation mode, an inverter circuit for controlling the armature current operates just as a conventional rectifier circuit. This is because flywheel diodes which are in antiparllel connection with semiconductor switching elements of the inverter circuit function as a full-wave rectifier. Let us assume that, in the inverter circuit functioning as a three-phase full-wave rectifier, for example, a semiconductor switching element of a U-phase upper arm outputs generated current to a DC power source side, and that semiconductor switching elements of V-phase and W-phase lower arms charge the generated current. In this situation, if the semiconductor switching element of the V-phase upper arm is turned on, a short circuit is formed through the U-phase winding, the U-phase upper arm element, the V-phase upper arm element, the V-phase winding, the neutral point, and the U-phase winding. As a result, a large short-circuit current flows through the U-phase and V-phase windings, which short circuit can be controlled by interrupting the V-phase upper arm element. Specifically, in a phase period when a U-phase voltage is maximum in a positive direction, the V-phase upper arm element or the W-phase upper arm element can allow the field winding to generate AC voltage by allowing the U-phase lower arm element to control the armature short circuit current at a frequency different from the synchronizing frequency.

In a preferred aspect, the rotor exciting current is different in frequency from the synchronous current. That is, means for supplying the rotor exciting current controls the rotor exciting current as an AC current which is passed through the armature winding. The means for supplying the rotor exciting current can be parallelly or serially connected to an AC power source, such as an inverter, which supplies the above synchronizing current to the armature winding. In this case, however, a problem arises that the synchronizing current is passed through the means for supplying the rotor exciting current, and that the rotor exciting current is passed through the AC power source.

In a preferred aspect, the rotor exciting current changes at a speed which is four or more times larger than a change speed of the synchronous current to be fed into each phase. Thus, a field current, which is essentially a DC current, can be supplied to the field winding. The rectifier circuit may also have a semiconductor switching element connected in series to the field winding, a detection circuit for detecting signals associated with the direction of the induced AC current, and a synchronous rectification control circuit which effects synchronous rectification to the induced AC current by intermittently controlling the semiconductor switching element based on the signals associated with the direction of the induced AC current. Thus, the AC voltage supplied to the field winding can substantially be synchronously rectified, so that rectification loss can be reduced. It should be appreciated that, in the present aspect, source power for the detection circuit and the synchronous rectification control circuit can be formed by subjecting the AC voltage to diode rectification.

In a preferred aspect, the current suppressor includes a rectifier half-wave rectifying the induced alternating current. Thus, the high variation speed of the rotor exciting current can enhance the degree of the electromagnetic coupling between !he armature and the short circuit winding, whereby rotor exciting power can be efficiently supplied.

In a preferred aspect, the current supplier is configured to supply the rotor exciting current during a period of phase time having a predetermined current amplitude other than a remaining period of phase time having a current amplitude larger than the predetermined current amplitude. Waveforms of the rotor exciting current may be pulsed waveforms or high-frequency AC current waveforms. In this way, the maximum peak value of the armature current can be decreased, so that resistance loss of the armature winding and the inverter can be decreased.

In a preferred aspect, the rotor exciting current includes an alternating current whose frequency is higher than the synchronous current to be supplied through the armature winding for each phase. Thus, power can be efficiently transmitted to the field winding.

In a preferred aspect, the synchronous machine further comprises an inverter supplying not only the synchronous current to the armature in accordance with a rotation angle of the rotor but also the rotor exciting current. Thus, the inverter circuit for controlling motor torque can form the rotor exciting current concurrently with the synchronizing current, so that the circuit arrangement can be simplified.

In a preferred aspect, the predetermined period of time shorter than the one cycle of the synchronous motor is set to ¼ or less of the one cycle on which the fundamental component of the synchronous current is supplied. Thus, waveforms of multiphase current as the synchronizing current will not be misshaped over a long period of time, so that noise and vibration can be expected to be reduced.

In a preferred aspect, the synchronous machine comprises a rectifier rectifying currents to be generated by the armature winding, wherein the rotor exciting current is mixed with the generated current. As a matter of course, an apparatus for forming the rotor exciting current can be separately provided from the rectifier. Alternatively, the rectifier and the apparatus for forming the rotor exciting current may be provided in integration. The generated power can also be utilized for the rotor exciting power. In this arrangement, the generated power and the generated voltage of a synchronous generator can be well controlled without using a contact type rotor powering mechanism.

In a preferred aspect, the field-winding type of synchronous machine of the present invention is employed such that the synchronous machine is linked with wheels of a vehicle in order to generate power to drive the wheels. This resolves the problems involved in suppressing back electromotive force and suppressing generated current during high-speed rotation, which have been difficult to control.

In a preferred aspect, the rotor exciting current includes two types of current whose frequencies are different from a frequency of the synchronous current.

The present invention can also be applied to an on-vehicle AC generator and an on-vehicle generator-motor for conducting both of engine starting and generation. The inventive field-winding type of synchronous machine of armature-winding powering system may be provided with permanent magnets in the rotor. In this case, a field-winding field flux formed by the field winding should preferably be oriented to the same direction as a field flux formed by the permanent magnets. However, if the motor torque and the armature winding voltage are desired to be reduced, these field fluxes may be formed being oriented to opposite directions with each other. For example, it is preferable that the field flux is generated so as to circulate in d-axis and minus d-axis, and that the field-winding field flux is generated so as to also circulate in the d-axis and the minus d-axis.

In a preferred aspect, a rotor has a soft magnetic rotor core having magnetic salient-pole portions. In addition, the rotor core is formed to have a radial direction, an axial direction and a circumferential direction and has a plurality of magnet accommodating holes each accommodating a magnet therein, each being embedded near to an outer circumferential surface of the rotor core, and each being axially opened, and soft magnetic beam portions each being adjacently positioned between two of the accommodating holes in the circumferential direction, each supporting and forming the outer circumferential surface of the rotor core, and each allowing magnetic flux to pass, the magnetic flux being produced responsively to the induced alternating current through the field winding and interlinking with the armature winding. This aspect is particularly characteristic in that a so-called magnet-embedded structure (IPM (Interior Permanent Magnet) structure) has been employed as a rotor structure, and that soft magnetic beam portions have been arranged so as to be circumferentially adjacent to the magnets and to run through the armature winding.

According to this aspect, the following effects can be achieved. First, similar to the conventional IPMs, the magnet-embedded structure enables to use reluctance torque as well as to provide good support for the magnets In this second invention, the soft magnetic beam portions are provided adjacent to the embedded magnets along the circumference thereof so as to run through the field winding. Preferably, the field winding may be wound about both the magnets and the beam portions in the rotor core. In this case, the flux formed by the field winding (field-winding field flux) assists the magnetic flux in plus or minus direction. In this way, the soft magnetic beam portions contribute to constituting a flux path formed by the field winding, and serves as support members for mechanically supporting the outer peripheral portion of the rotor core which supports the embedded magnets on which the centrifugal force is imposed. Thus, the beam portions enhance the mechanical strength of the rotor and improves high-speed rotation performance of the rotor. The beam portions can also be utilized as an exciting magnetic circuit at the time the rotor field winding is excited by current flowing through the stator winding.

In a preferred aspect, the rotor core has at least one pair of grooves each being axially opened, each being located so as to form a line together with the beam portions, and the magnet accommodating holes in the circumferential direction and locating accommodating therein the field winding. In other words, in this aspect, the field winding is wound about the rotor core so as to be embedded in grooves of the rotor core. Thus, the field winding can be readily supported, while well forming flux at the beam portions.

In a preferred aspect, each of the beam portions is located between a pair of ones among the magnet accommodating holes, the pair of magnet accommodating poles accommodate a pair of magnets, respectively, being adjacent to each other in the circumferential direction and having the same magnetized direction in the radial lo direction. In this arrangement, the outer peripheral portion of the rotor core which is located outside the magnet accommodating holes can be mechanically well supported by the beam portions to thereby improve the high-speed rotation performance.

In a preferred aspect, each of the beam portions is located is between each magnet accommodating hole and each groove in the circumferential direction. In this way, the magnet accommodating holes and the field winding accommodating grooves are defined by the beam portions, and heat of the field winding can be well diffused. Also, the centrifugal force imposed on the field winding and the magnets can be well supported by the beam portions.

In a preferred aspect, plural beam portions included in the beam portions are located between two grooves composing the one pair of grooves. Thus, the outer peripheral portion of the rotor core which is located outside the magnet accommodating holes for accommodating the respective permanent magnets, can be mechanically well supported by the beam portions to thereby improve the high-speed rotation performance.

In a preferred aspect, a radially outer-side portion of the rotor core, which has the outer circumferential surface, is formed to be supported by the beam portions, to be extended in the circumferential direction to narrow a radial opening of each of the grooves. Thus, the fluxes formed by the field winding and the permanent magnets can be excellently provided to the stator core. Further, the circumferential variation of the flux density in the electromagnetic gap made between the rotor core and the stator core can be smoothed.

In a preferred aspect, the fundamental wave component of the armature current has a root-mean-square value higher than ½ of a root-mean-square value of all current, in which half or more of a root-mean-square component of current other than the fundamental wave component resides within a period of time corresponding to ¼ of each phase cycle of the fundamental wave component. Thus, since the frequency band of the primary excitation current (rotor exciting current) has been made large, the secondary excitation current can be efficiently supplied to the short-circuit winding in a short time. More particularly, for example, in the fundamental wave components of the synchronizing current, or the multiphase AC current, which are associated with effective torque generation, the rotor exciting current can be superimposed by avoiding phase periods having large amplitude. Accordingly, circuits and power sources for superimposing the rotor exciting current can be simplified.

It should be noted that the waveform of the rotor exciting current may, for example, be a pulsed waveform and a high-frequency AC waveform. Since the pulsed current has a number of high-frequency components, electromagnetic induction to the field winding can be well performed. Further, since current is supplied for a short time, ripple of the rotor torque and magnetic noise can be reduced. Further, by supplying current of pulsed high-frequency components (primary excitation current) during a period of ¼ or less (i.e. $\pi/2$) of one cycle of the fundamental wave components (synchronizing current), the influences of the torque ripple can be suppressed to a level which is sufficiently low for practical use. Generally, in this manner of armature current control, torque processing is typically performed through dq rotating coordinate conversion. Therefore, if the period for supplying current of the pulsed high-frequency components (primary excitation current) Ir1 is less than a period of ¼ or less of the one cycle, the superimposition can be completed while a d-axis current and a q-axis current are both present in one quadrant of the dq rotating coordinate system. Thus, symbols of the d-axis current and the q-axis current do not have to be changed. This means that the torque ripple can be reduced.

In a preferred aspect, the synchronous machine further comprises an inverter supplying not only the synchronous current to the armature in accordance with a rotation angle of the rotor but also the rotor exciting current, wherein the inverter is configured to decide a phase and an amplitude of the rotor exciting current such that a sum of both a root-mean-square value of the fundamental wave component of the armature current for each phase and a root-mean-square value of the rotor exciting current is equal to or less than a permissible maximum root-mean-square value of the armature current for a predetermined one phase. Thus, the inverter and the individual arms can be effectively prevented from being passed through a current beyond an effective value of a permissible current carrying capacity thereof. It should be noted that if a current beyond the effective value of a permissible current carrying capacity is instantaneously passed through the inverter and the individual arms, no problem is caused since the period is only instantaneous, and since heat generation and temperature rising induced by the heat generation have correlation to the effective value.

In a preferred aspect, the inverter is configured to mix, of the rotor exciting currents for all the phase, the rotor exciting current having a maximum amplitude, with the armature current for the corresponding phase during only a period of phase $\beta$ ranging from a peak phase angle for the corresponding phase to a phase angle $\alpha$. Thus, the rotor exciting current of large amplitude can be supplied, while preventing the waveforms of the phase current from being misshaped.

In a preferred aspect, wherein the phase angle $\alpha$ is 0 to 160 degrees and the period of phase $\beta$ is 0.1 to 60 degrees, and the rotor is composed of a rotor with no permanent magnet embedded therein. Thus, a rotor exciting current of large amplitude can be supplied.

In a preferred aspect, the phase angle $\alpha$ is 60 to 210 degrees and the period of phase $\beta$ is 0.1 to 60 degrees, and the rotor is composed of a rotor with permanent magnet embedded therein. Thus, a rotor exciting current of large amplitude can be supplied.

In a preferred aspect, timing for supplying the rotor exciting current is set so that, in cases where the rotor has a magnetic salient pole facing an inner circumferential surface of the stator, the current supplier supplies the rotor exciting current for each phase producing magnetic flux of which circumferential central position is within a circumferential range occupied by the magnetic salient pole at a time instant when the rotor exciting current for each phase shows a peak value thereof. Thus, the phases of composite magnetic field vectors formed by the rotor exciting currents of the individual phases match the respective phases of the magnetic salient-pole portions, so that flux can be efficiently formed at the magnetic salient-pole portions. In other words, in order to effectively use the rotor exciting currents, these currents should preferably be supplied in such a way that the timing for superimposing the pulsed high-frequency components (primary excitation current) upon the fundamental wave components of the armature current coincides with the timing when the direction of the vectors of the pulsed high-frequency components (primary excitation current) matches the direction of the magnetic salient-pole portions (phase angle) on the dq rotating coordinate system.

In a preferred aspect, the current supplier is configured to supply the rotor exciting current two times at most during one cycle of the fundamental wave component of the armature current for each phase. Thus, large electric power can be transmitted to the field winding, while reducing waveform distortion. Specifically, since the rotor has a pair of magnetic salient-pole portions which are apart from each other by an electrical angle $\pi$, and since the field winding which is short-circuited via the diodes is wound about the magnetic salient-pole portions, there are two suitable timings, in the electrical angle $2\pi$, i.e. in one cycle of the three-phase armature voltage, for superimposing the pulsed high-frequency components. Accordingly, it is preferable that the pulsed high-frequency components are superimposed twice upon the fundamental wave components of the armature voltage of each of the phases during one cycle of the fundamental wave.

In a preferred aspect, the synchronous machine further comprises an inverter supplying not only the synchronous current to the armature in accordance with a rotation angle of the rotor but also the rotor exciting current for three phases to the alternating current, wherein the inverter is configured to supply the rotor exciting current for each phase such that, of the rotor exciting currents for the respective three phases, the rotor exciting current for one phase has an amplitude which is substantially double an amplitude of each of the rotor exciting currents for the remaining two phases. Thus, in the stator winding (armature winding) of three-phase connection (preferably, three-phase star connection), the rotor exciting current can be symmetrically distributed to each of the phases, by which large electric power can be transmitted to the field winding while reducing waveform distortion.

In a preferred aspect, the synchronous machine further comprises an inverter supplying not only the synchronous current to the armature in accordance with a rotation angle of the rotor but also the rotor exciting current for multiphases of the alternating current, wherein the inverter is configured to generate a rotor exciting voltage to supply the rotor exciting current for each phase. Thus, suitable waveforms can be achieved in the armature current, which is a current obtained by composing the fundamental wave components of the multiphase current contributing to generating positive or negative torque, with the excitation current superimposed thereon.

In a preferred aspect, the inverter is configured to generate the rotor exciting voltage during a period of time other than timings at which multiphase alternating voltages resulting in the multiphase alternating currents have substantial maximum amplitudes thereof. The period excepting the period of the maximum amplitude proximity of the multiphase current voltage referred to herein may range from $-45$ ($-\pi/4$) to $+45$ ($+\pi/4$) degrees centering on zero level of each phase voltage of the multiphase AC voltage. Thus, voltage that can be applied to the inverter may be made large, and thus a required current can be supplied in a short period of time. As a result, time for supplying current, resistance loss (which is in proportion to squared current), and temperature rising may all be reduced. Also, power source voltage applied to the inverter can be reduced.

In a preferred aspect, the inverter is configured to generate the rotor exciting voltage for each phase such that a sum of the multiphase alternating voltage for each phase and the rotor exciting voltage for each phase is kept within a maximum amplitude of the multiphase alternating voltage for each phase. Thus, the same effects as described above can be achieved.

In a preferred aspect, the inverter is configured to superimpose the rotor exciting voltage for each phase on the multiphase alternating voltage for each phase, the rotor exacting voltages being either pulsed voltages or pulse-width modulated voltages and the multiphase alternating voltages being pulse-width modulated voltages. Thus, the rotor exciting voltage can be excellently and readily superimposed in the predetermined phase period of the multiphase AC voltage.

In a preferred aspect, the inverter is configured to superimpose a positive pulse voltage of each rotor exciting voltage on a high-level of the multiphase alternating voltage for each phase and to superimpose a negative pulse voltage of each rotor exciting voltage on a low-level of the multiphase alternating voltage for each phase, both the high-level and the low-level respectively having a deliberately widened period of time. In this way, superimposition of the rotor exciting voltage can be achieved while suppressing the increase of the number of times of switching of the inverter, whereby inverter loss can be reduced.

In a preferred aspect, the positive pulse voltage and the negative pulse voltage are superposed on the multiphase alternating voltage at a substantial zero-cross point of the multiphase alternating voltage. In this way, large excitation current can be induced to the short-circuit winding without increasing the power source voltage applied to the inverter.

In a preferred aspect, the inverter is configured to superimpose a positive pulse voltage of each rotor exciting voltage on the multiphase alternating voltage for each phase during a positive half-wave period thereof and to superimpose a negative pulse voltage of each rotor exciting voltage on the multiphase alternating voltage for each phase during a negative half-wave period thereof. In this way, turbulent waveforms as well as magnetic noise can be reduced. Further, the amplitude of the power source voltage applied to the armature winding can also be reduced.

In a preferred aspect, the rotor includes a magnetic path of short-circuit flux for radially supplying the flux formed by the current flowing through the short-circuit winding, and permanent magnets located at the magnetic salient-poles, for forming field poles on the outer peripheral surface of the rotor.

DETAILED DESCRIPTION OF THE PREFERRED EMBODIMENTS

Figure 1:
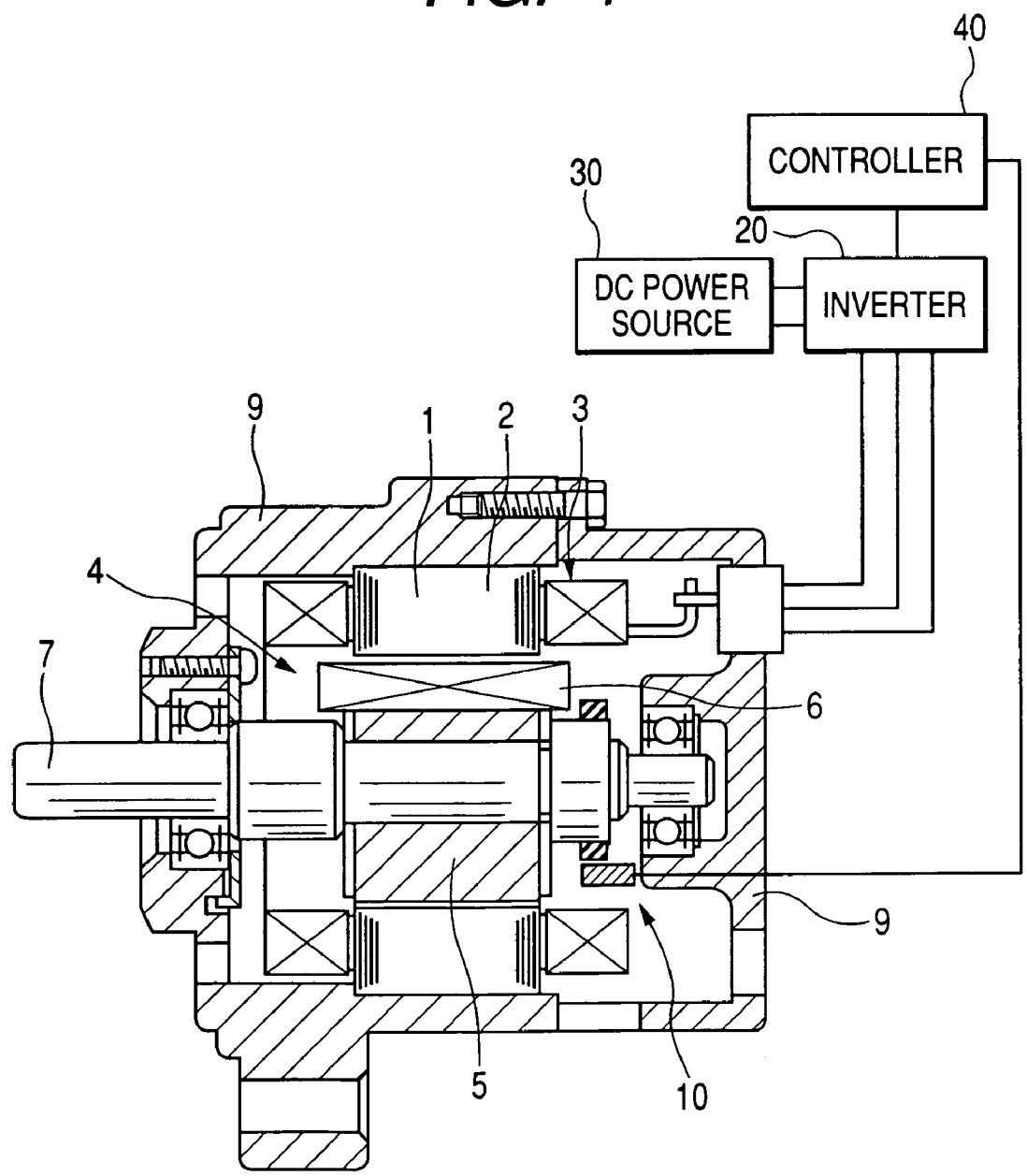
FIG. 1 is a diagrammatic axial cross section illustrating an arrangement of a field-winding type of synchronous machine using armature-winding power supply technique, according to a first embodiment of the present invention.

The preferred aspects of the present invention will now be described in detail as various embodiments. It should be noted, however, that the present invention should not be interpreted as being limited to the embodiments described below, but can be practiced in combination with other known art or other art having required functions common to the known art. It should be noted that throughout the following embodiments, like reference numerals refer to like parts or identical parts.

First Embodiment

With reference to FIG. 1, a field-winding type of synchronous machine using armature-winding power supply technique according to a first embodiment of the present invention is described. FIG. 1 is a diagrammatic axial cross section of the field-winding type of synchronous machine (motor). This synchronous machine can be applied to hybrid vehicles, fuel cell vehicles, electric vehicles and the like as an on-vehicle driving power generating apparatus.

In FIG. 1, indicated by 1 is a stator, by 2 is a stator core, and by 3 is a stator winding (armature winding) wound about the stator core 2. Further, indicated by 4 is a rotor, by 5 is a rotor core, by 6 is a rotor winding (field winding) wound about the rotor core 5, and by 7 is a rotor shaft. Indicated by 9 is a frame (so-called housing) which is fixed to the stator 1 and rotatably supports the rotor 4. Indicated by 10 is a position sensor for detecting a rotational position of the rotor. The position sensor 10 is fixed to the rotor shafts 7 so as to be located facing an outer peripheral surface of a magnetic annular plate in which magnetic salient-poles are formed along the circumference thereof at a certain pitch. The position sensor 10 detects passage of the magnetic salient-poles to detect a rotational position. Indicated by 20 is an inverter for controlling armature current of the stator winding 3 based on signals output from the position sensor 10 and a controller 40, and by 30 is a DC power source for supplying power required by the inverter 20.

Figure 2:
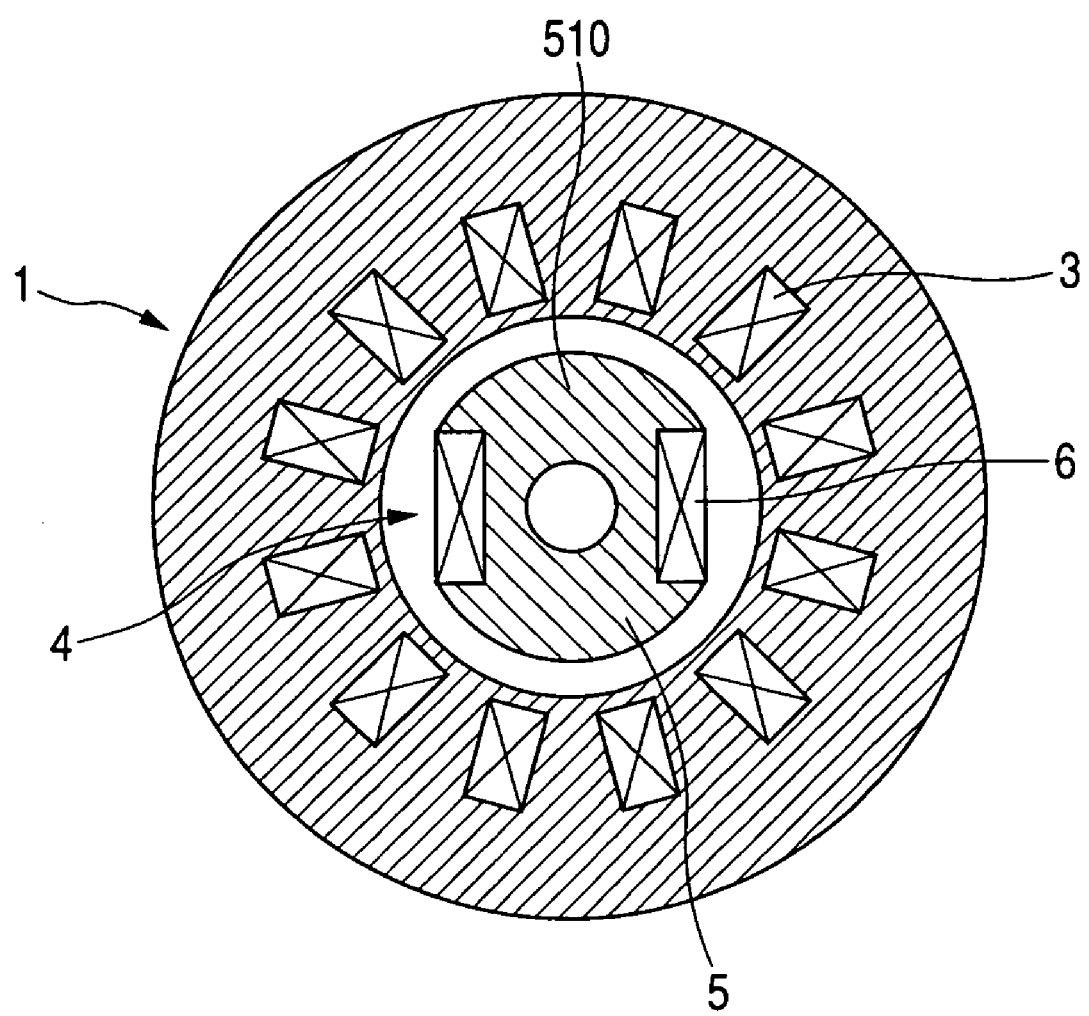
FIG. 2 is a radial cross section of the field-winding type of synchronous machine illustrated in FIG. 1.

FIG. 2 shows a radial cross section of the stator 1 and the rotor 4. The stator winding 3 has three-phase windings. The controller 40 intermittently controls the inverter 20 so that an armature current corresponding to a rotational position of the rotor 4, which has been obtained from the position sensor 10, is supplied to the stator winding 3. In this embodiment, the rotor core 5 of the rotor 4 has a core teeth portion 510 constituting a pair of field poles (magnetic salient-poles). The rotor winding 6 is wound about the core teeth portion 510 in a square shape to form a field flux at the core teeth portion 510. Since the structure and operation of this type of field-winding type of synchronous machines are known, further description is omitted.

Figure 3:
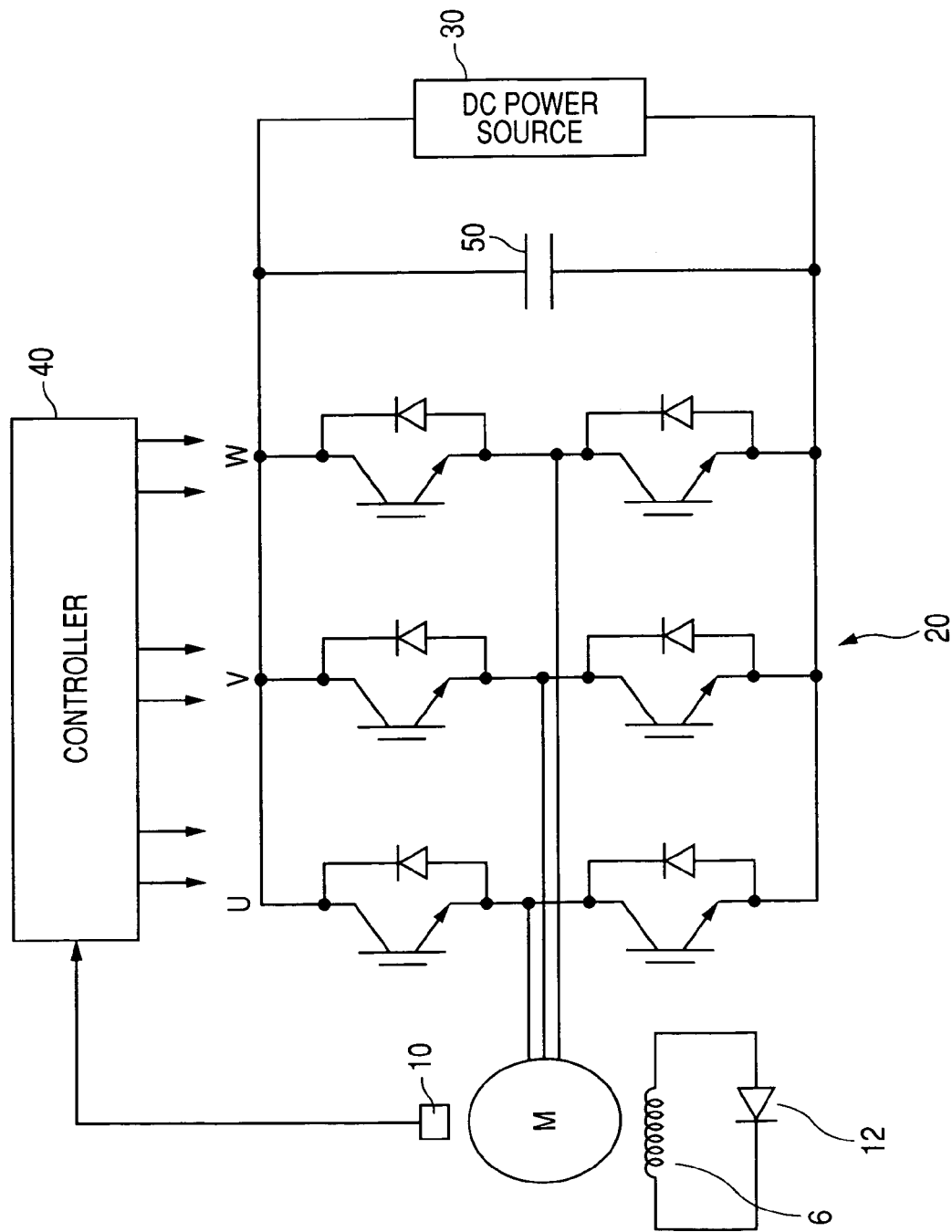
FIG. 3 is a circuit diagram of the field-winding type of synchronous machine illustrated in FIG. 1.

A circuit of the field-winding type of synchronous machine is shown in FIG. 3. Indicated by 50 is a smoothing capacitor. The three-phase inverter 20 has three upper arm elements in all, and three lower arm elements in all, each arm element being made up of an IGBT and a flywheel diode. The individual arm elements may, of course, be substituted by MOS transistors. This embodiment is characteristic in that the rotor winding 6 is in the state of being short-circuited via a diode 12. The diode 12 effects half-wave rectification to AC voltage induced to the rotor winding 6 to excite one counterpart of the pair of core teeth portion 510 as an N pole, and the other counterpart as an S pole.

In this embodiment, in order that the AC voltage is induced to the rotor winding 6, the inverter 20 supplies a special AC current (rotor exciting current) to the stator winding 3. Accordingly, the armature current flowing through the stator winding 3 is equal to the sum of a synchronizing current, i.e. current components for generating torque, and the rotor exciting current.

Figure 4:
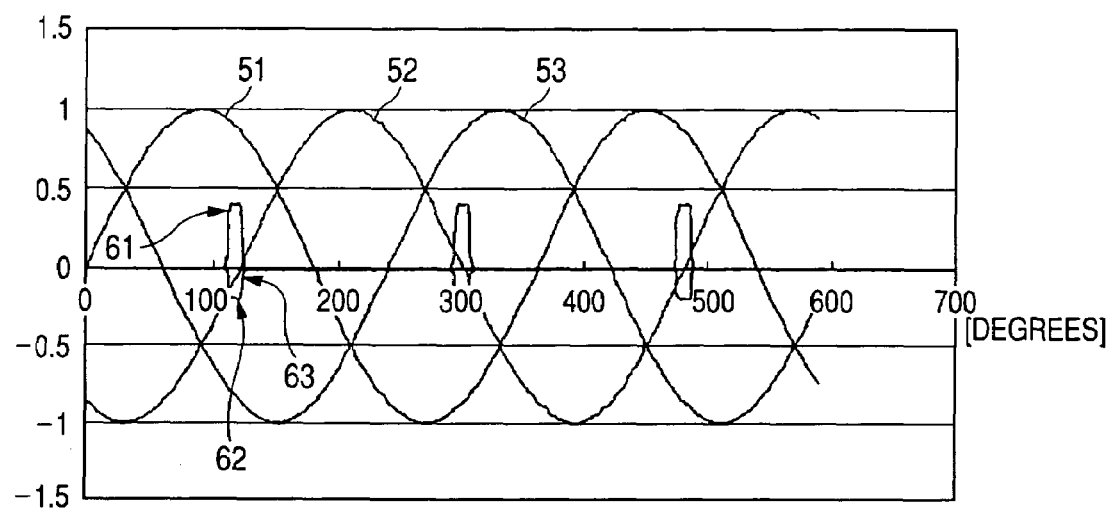
FIG. 4 is a current waveform diagram illustrating an example of controlling current supplied to three-phase armature current in the field-winding type of synchronous machine illustrated in FIG. 1.

With reference to FIG. 4, an example of controlling the three-phase armature current by the inverter 20 is described below. Indicated by 51 is a U-phase armature current, by 52 is a V-phase armature current, and by 53 is a W-phase armature current, which are fundamental wave currents (synchronizing currents) having sine-wave waveforms. Indicated by 61-63 are rotor exciting currents which are superimposed on the armature currents 51-53 of the respective phases. In this embodiment, the rotor exciting current 61 is superimposed on the V-phase armature current, the rotor exciting current 62 is imposed on the U-phase armature current, and the rotor exciting current 63 is superimposed on the W-phase armature current.

Figure 5:
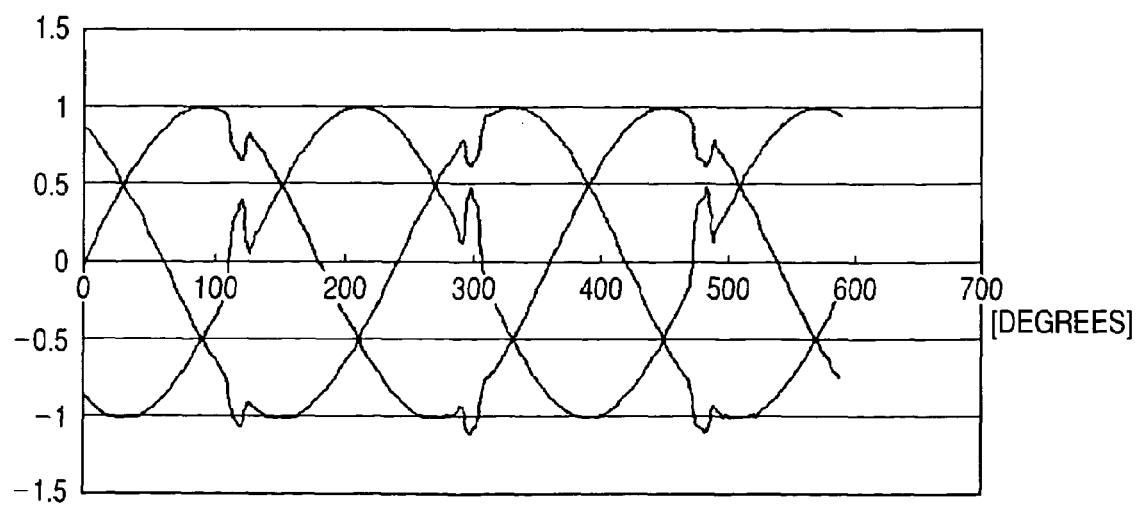
FIG. 5 is a current waveform diagram illustrating waveforms of a composite three-phase armature current in the field-winding type of synchronous machine illustrated in FIG. 1.

These rotor exciting currents 61-63 should have high frequency in comparison with the frequency of the armature currents 51-53 which are synchronizing currents (fundamental wave currents), and should have pulsed waveforms in this embodiment. AC fields, which are formed by supplying the rotor exciting currents 61-63 to the stator winding 3, are interlinked with the rotor winding 6 to produce AC voltage in the rotor winding 6. Since the rotor winding 6 is in the state of being short-circuited via the diode 12, only unidirectional current flows through the rotor winding 6 to impart the rotor core 5 with excitation in a predetermined direction, so that a pair of field poles are formed in the rotor core 5. Specifically, in the present embodiment, field flux is formed by supplying the rotor exciting currents 61-63 to the stator winding 3 and by rectifying the AC voltage induced to the rotor winding 6. Preferably, the pulsed current should be supplied instantaneously in a phase which would not cause torque in the rotor. FIG. 5 shows composite waveforms of a phase current in which the fundamental wave currents (synchronizing current) and the rotor exciting currents shown in FIG. 4 have been composed.

It is preferable that the amplitudes of the composite waveforms of a phase current of each of the phases are set so as not to exceed the amplitudes of the fundamental wave currents. To this end, as shown in FIG. 4, the pulsed rotor exciting currents 61-63 only have to be supplied avoiding the periods in which the amplitudes of the individual fundamental wave currents reach the proximity of a peak.

Second Embodiment

Figure 6:
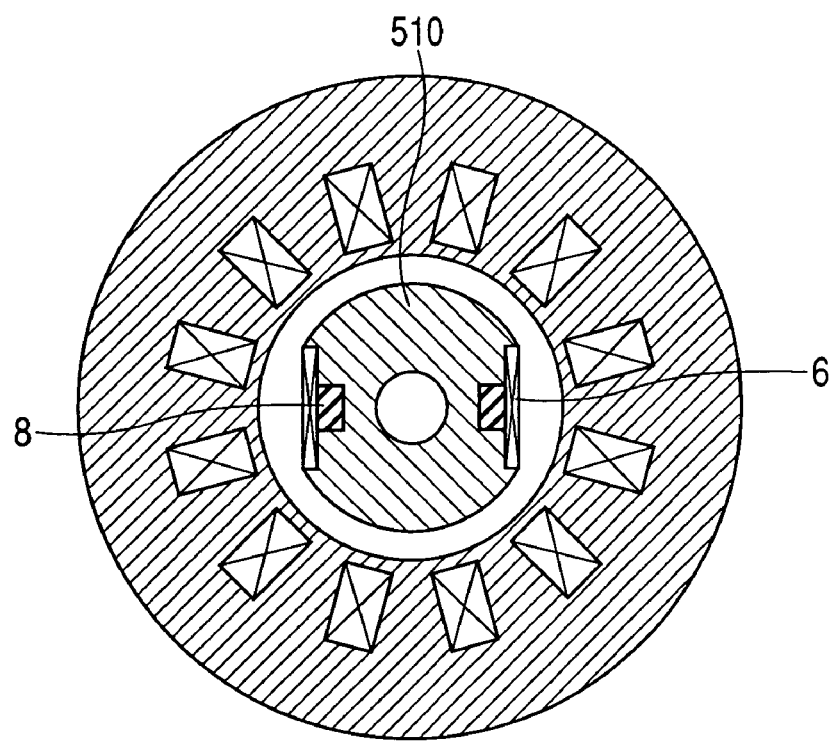
FIG. 6 is a radial cross section illustrating an arrangement of a field-winding type of synchronous machine using armature-winding power supply technique, according to a second embodiment of the present invention.

With reference to FIG. 6, a field-winding type of synchronous machine using armature-winding power supply technique is described below. FIG. 6 shows a diagrammatic radial cross section of the field-winding type of synchronous machine (motor). In this embodiment, indicated by 8 are permanent magnets for producing field flux. The permanent magnet 8 produces field flux in the same direction as that of the field flux formed by the rotor winding 6. Thus, according to the present embodiment, the excitation assisted by the permanent magnets may suppress the increase of torque and reduce excitation current.

Third Embodiment

Figure 7:
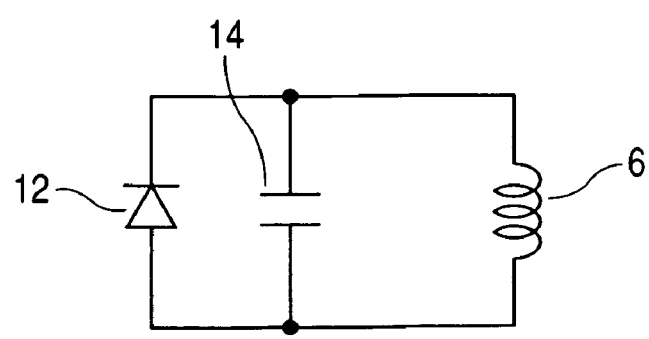
FIG. 7 is a circuit diagram illustrating an arrangement of a field-winding type of synchronous machine using armature-winding power supply technique, according to a third embodiment of the present invention.

With reference to FIG. 7, a field-winding type of synchronous machine using armature-winding power supply technique, according to a third embodiment is described. In this embodiment, a capacitor 14 is connected parallel to the diode 12. This arrangement may stabilize the excitation current flowing through the rotor winding 6 and voltage generated therein. However, in the present embodiment, effective size of the field flux becomes small because, among the AC currents induced to the rotor winding 6, half-wave components of opposite phase that should be shut out are passed through the capacitor 14.

Fourth Embodiment

Figure 8:
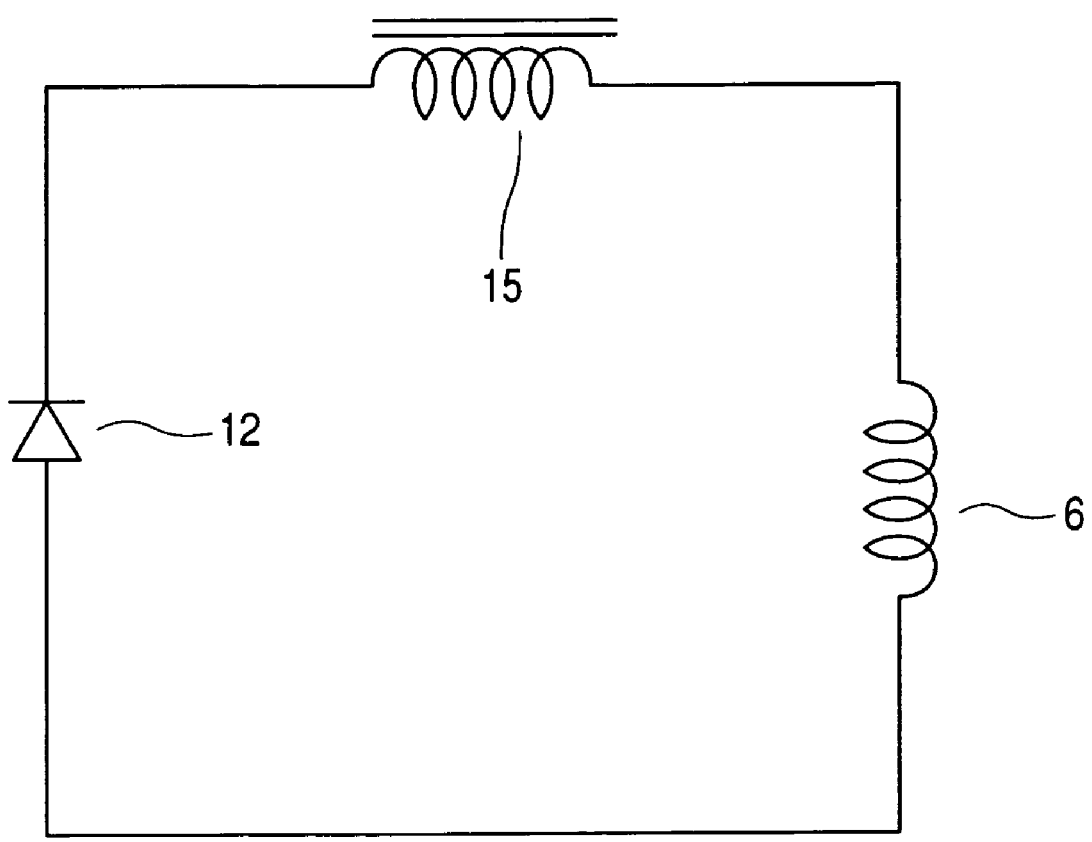
FIG. 8 is a circuit diagram illustrating an arrangement of a field-winding type of synchronous machine using armature-winding power supply technique, according to a fourth embodiment of the present invention.

With reference to FIG. 8, a field-winding type of synchronous machine using armature-winding power supply technique, according to a fourth embodiment is described. In this embodiment, a choke coil 15 is connected to the diode 12 in series. A magnetic circuit of the choke coil can be formed using a circumferential inner side portion or the like of the rotor core. In this manner, when AC voltage is induced to the rotor winding 6 to allow the diode 12 to unidirectionally supply a current to the circuit, magnetic energy is stored in the choke coil 15. Thus, in the inversed half-wave period of the AC voltage as well, the period for supplying excitation current can be prolonged owing to the voltage produced by the choke coil 15 to thereby smooth the amplitude fluctuation of the excitation current.

Fifth Embodiment

Figure 9:
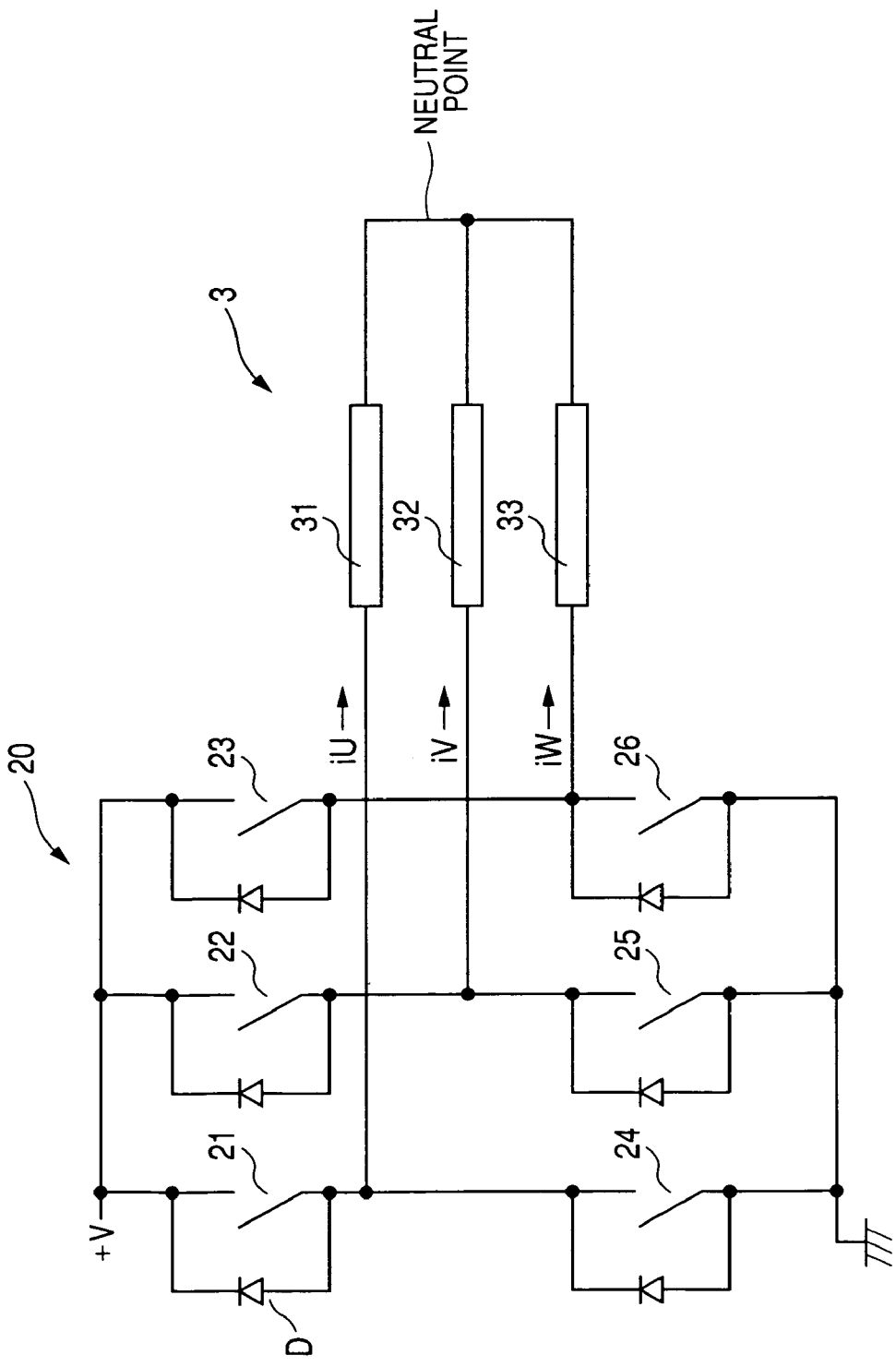
FIG. 9 is a circuit diagram illustrating an arrangement of a field-winding type of synchronous machine using armature-winding power supply technique, according to a fourth embodiments 5 and 6 of the present invention.

With reference to FIG. 9, a field-winding type of synchronous machine using armature-winding power supply technique, according to a fifth embodiment is described. This embodiment is characteristic in that a rotor exciting current of high-frequency, which is higher than synchronizing frequency, is continuously supplied to an inverter circuit. The rotor exciting current may have a sine-wave or trapezoidal-wave waveform. However, the maximum current which can be supplied to the armature winding of each of the phases by the inverter 20, is limited by DC power source voltage applied to the inverter 20. Therefore, the sum of a phase voltage for producing the fundamental wave current (synchronizing current) and a phase voltage for producing the rotor exciting current, is controlled so as not to exceed the DC power source voltage.

The present embodiment is characteristic in that the direction of supplying the rotor exciting current of each of the phases is controlled according to the rotational position of the rotor core 5. With reference to FIG. 9, detailed description is provided below. In FIG. 9, the inverter 20 has a U-phase upper arm element 21, a V-phase upper arm element 22, a W-phase upper arm element 23, a U-phase lower arm element 24, a V-phase lower arm element 25, and a W-phase lower arm element 26. Each of the arm elements is a semiconductor switching element, and has a flywheel diode D which is in anti-parallel connection with the arm element.

In the stator core 2 shown in FIG. 2, winding of each of the phases structuring the armature winding should be wound in a distributed manner about a U-phase conductor, a minus V-phase conductor, a W-phase conductor, a minus U-phase conductor, a V-phase conductor and a minus W-phase conductor, in this order, along the circumferential direction. Accordingly, the two magnetic field poles of the rotor core 5 are to have the following respective phase periods. The sum total of the respective phase periods is electrical angle $2\pi$.

The first phase period is a phase that faces an AC field formed by the rotor exciting current flowing through the U-phase conductor, the minus V-phase conductor, and the W-phase conductor. The second phase period is a phase that faces an AC field formed by the rotor exciting current flowing through the minus V-phase conductor, the W-phase conductor, and the minus U-phase conductor. The third phase period is a phase that faces an AC field formed by the rotor exciting current flowing through the W-phase conductor, the minus U-phase conductor, and the V-phase conductor. The fourth phase period is a phase that faces an AC field formed by the rotor exciting current flowing through the minus U-phase conductor, the V-phase conductor, and the minus W-phase conductor. The fifth phase period is a phase that faces an AC field formed by the rotor exciting current flowing through the V-phase conductor, the minus W-phase conductor, and the U-phase conductor. The sixth phase period is a phase that faces an AC field formed by the rotor exciting current flowing through the minus W-phase conductor, the U-phase conductor, and the minus V-phase conductor. In the first and fourth phase periods, the rotor exciting currents flowing through the U-phase conductor and the W-phase conductor are unidirectional, and the rotor exciting current flowing through the V-phase conductor is in inverse direction. It should be noted that the direction of the rotor exciting currents refers to a direction along which a current flows into the stator winding 3, and a direction along which a current flows out. Similarly, in the second and fifth phase periods, the rotor exciting currents flowing through the V-phase conductor and the U-phase conductor are unidirectional, and the rotor exciting current flowing through the W-phase conductor is in inverse direction. Similarly, in the third and sixth phase periods, the rotor exciting currents flowing through the W-phase conductor and the V-phase conductor are unidirectional, and the rotor exciting current flowing through the U-phase conductor is in reversed direction.

As described above, since the rotor exciting currents have high frequency, the direction for supplying currents changes a plurality of times in one phase period. Switching of directions along which the respective rotor exciting currents flow may be controlled based on a detected angular position of the rotor. In this way, the flux formed by the rotor exciting current flowing through the winding of each of the phases can be efficiently interlinked to the field winding.

Sixth Embodiment

With reference to FIG. 9, a field-winding type of synchronous machine using armature-winding power supply technique, according to a sixth embodiment is described below. This embodiment is provided in order to describe a method for supplying a rotor exciting current in case of this synchronous machine is operated in a generation mode.

Since the inverter 20 has flywheel diodes, it substantially operates, in the generation mode, as merely a three-phase full-wave rectifier. As a matter of course, synchronous rectification may be performed for reducing the loss of flywheel diodes D by turning on the semiconductor switching elements during the period when the flywheel diodes D, which are in anti-parallel connection with the switching elements, are turned on.

However, in case of performing rectification for generation using the inverter 20, if the individual semiconductor switching elements 21-26 constituting the inverter 20 are turned on during the phase periods when they should not originally be turned on at the time of rectification for generation, a portion of phase windings 31-33 is short-circuited, so that the short-circuit current can be passed through the phase windings 31-33. Since this short-circuit current can be passed through the phase windings 31-33 any time, a field having a speed different from that of the fundamental wave current forming a rotating field which is in synchronization with the rotor speed, should be able to be interlinked to the rotor winding 6.

Let us assume a phase period, for example, in which the semiconductor switching element 21 of the U-phase upper arm outputs generated current to a DC power source side, and the semiconductor switching elements 25 and 26 of the V-phase and W-phase lower arms charge current from the DC power source. In this situation, if the semiconductor switching element 22 of the V-phase upper arm, which should not be originally turned on, is turned on, a short-circuit is formed by the U-phase winding 31, the U-phase upper arm element 21, the V-phase upper arm element 22, the V-phase winding 32, the neutral point and the U-phase winding 31, so that a large short-circuit current is passed through the U-phase and V-phase windings. Accordingly, if the short-circuit current is interrupted at a predetermined interval, the rotor exciting current can be supplied to the stator winding 3. In case the W-phase upper arm element 23 is turned on, or in case the U-phase lower arm element 24 is turned on in the above phase period, the same effects can be achieved. It is apparent that the rotor exciting current having high frequency, which is higher than the synchronizing frequency, can be supplied to the stator winding 3 only during predetermined phase periods instead of supplying the current continuously. It is also apparent that the waveform of the rotor exciting current may be of sine-wave or trapezoidal-wave, or may be pulsed waveform.

The field-winding type of synchronous machine using armature-winding power supply technique of the present invention can also be applied to on-vehicle alternators, or on-vehicle generator-motors which perform both engine starting and generation. Further, permanent magnets can be additionally employed to the rotor of the field-winding type of synchronous machine using armature-winding power supply technique of the present invention. In this case, field flux formed by the field winding should preferably be formed in the same spatial phase for the field flux formed by the permanent magnets. For example, it is preferable that the magnetic field flux may be produced to circulate in d-axis and minus d-axis, and that the field-winding field flux may also be produced to circulate in d-axis and minus d-axis. However, in case the field-winding field flux is low, the magnetic field flux should preferably be adapted to short-circuit the magnetic path for the field-winding field flux.

Seventh Embodiment

Figure 10:
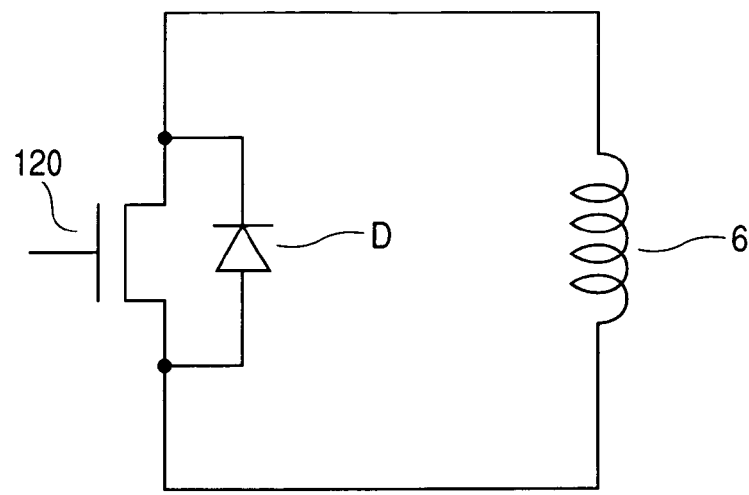
FIG. 10 is a circuit diagram illustrating an arrangement of a field-winding type of synchronous machine using armature-winding power supply technique, according to a seventh embodiment of the present invention.

With reference to FIG. 10, a field-winding type of synchronous machine using armature-winding power supply technique according to a seventh embodiment is described below. In this embodiment, the diode 12 for half-wave rectification is replaced by an MOS transistor 120 for synchronous rectification. The MOS transistor 120 is turned on concurrently with the turn on of its parasite diode. The gate voltage of the MOS transistor 120 may be derived from a DC power supply circuit which has been established by separately rectifying the voltage Induced by the rotor winding 6.

Eighth Embodiment

Figure 11:
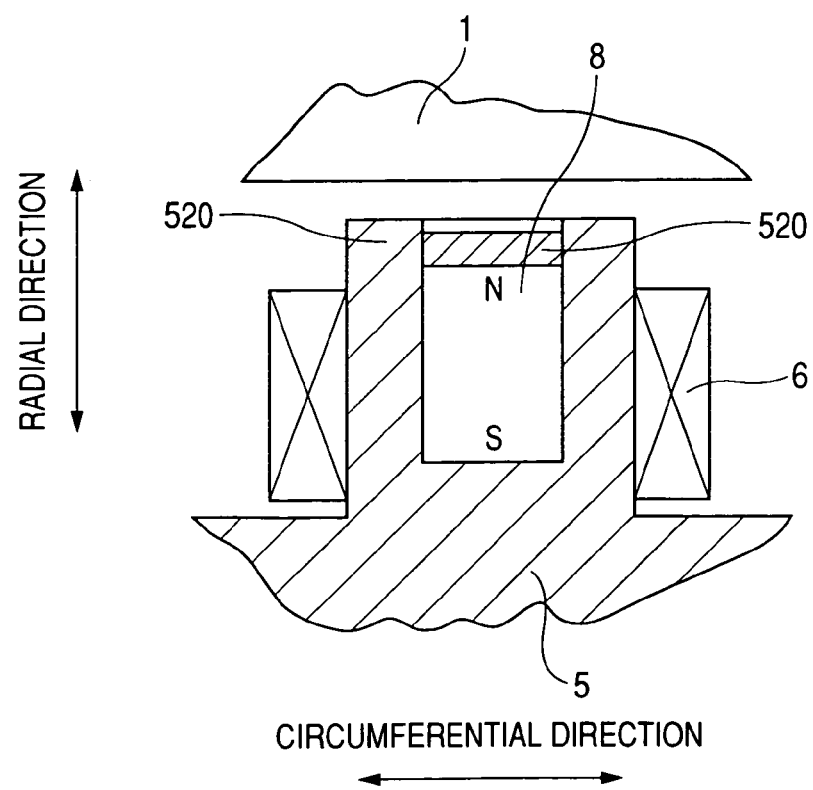
FIG. 11 is a partial radial cross section illustrating an arrangement of a field-winding type of synchronous machine using armature-winding power supply technique, according to an eight embodiment of the present invention.

With reference to FIG. 11, a field-winding type of synchronous machine using armature-winding power supply technique according to an eighth embodiment is described below. This embodiment is the same as the embodiment shown in FIG. 6 in that the permanent magnet 8 is additionally used in the rotor core 5, but is different in that a magnetic path for short-circuiting the magnetic field flux formed by the permanent magnets is formed in the rotor core so as to stand in a condition of magnetic saturation.

More particularly, FIG. 11 illustrates one N field pole. The magnetic field flux of the permanent magnet 8 has a short-circuit magnetic path 520 which magnetically short-circuits the permanent magnet 8. When no current is supplied to the rotor winding 6, this short-circuit magnetic path 520 is in the state of being magnetically saturated by the permanent magnet 8, with the remaining field flux of the permanent magnet being provided to the stator 1 for interlinkage with the stator winding 3. However, at the maximum speed of the synchronous machine, the voltage generated by the stator winding 3 is made slightly smaller than battery voltage, so that the battery cannot be charged by the permanent magnet 8 alone.

When a field flux is provided in the direction opposite to the direction of the saturated flux of the short-circuit path 520 by supplying rectified field current to the rotor winding 6, this field flux flows to the stator 1, so that the amount of field flux that interlinks with the stator winding 3 is increased. Thus, according to the present embodiment, the amount of field flux can be readily adjusted, while preventing demagnetization of the permanent magnets.

In case the stator current is controlled by dividing it into a d-axis current and a q-axis current, or by so-called vector control, AC current components having predetermined frequency of the d-axis current induce AC voltage to the rotor winding. Thus, by controlling the AC current components (which may also have a plurality of frequencies) of the d-axis current, the AC voltage can be induced to the rotor winding, Accordingly, with the rectification of this AC voltage, field current of desirable size can be passed through the rotor winding. Also, increase of input voltage required for the inverter can be suppressed, by effecting AM modulation, for example, to the q-axis current.

Ninth Embodiment

Figure 12:
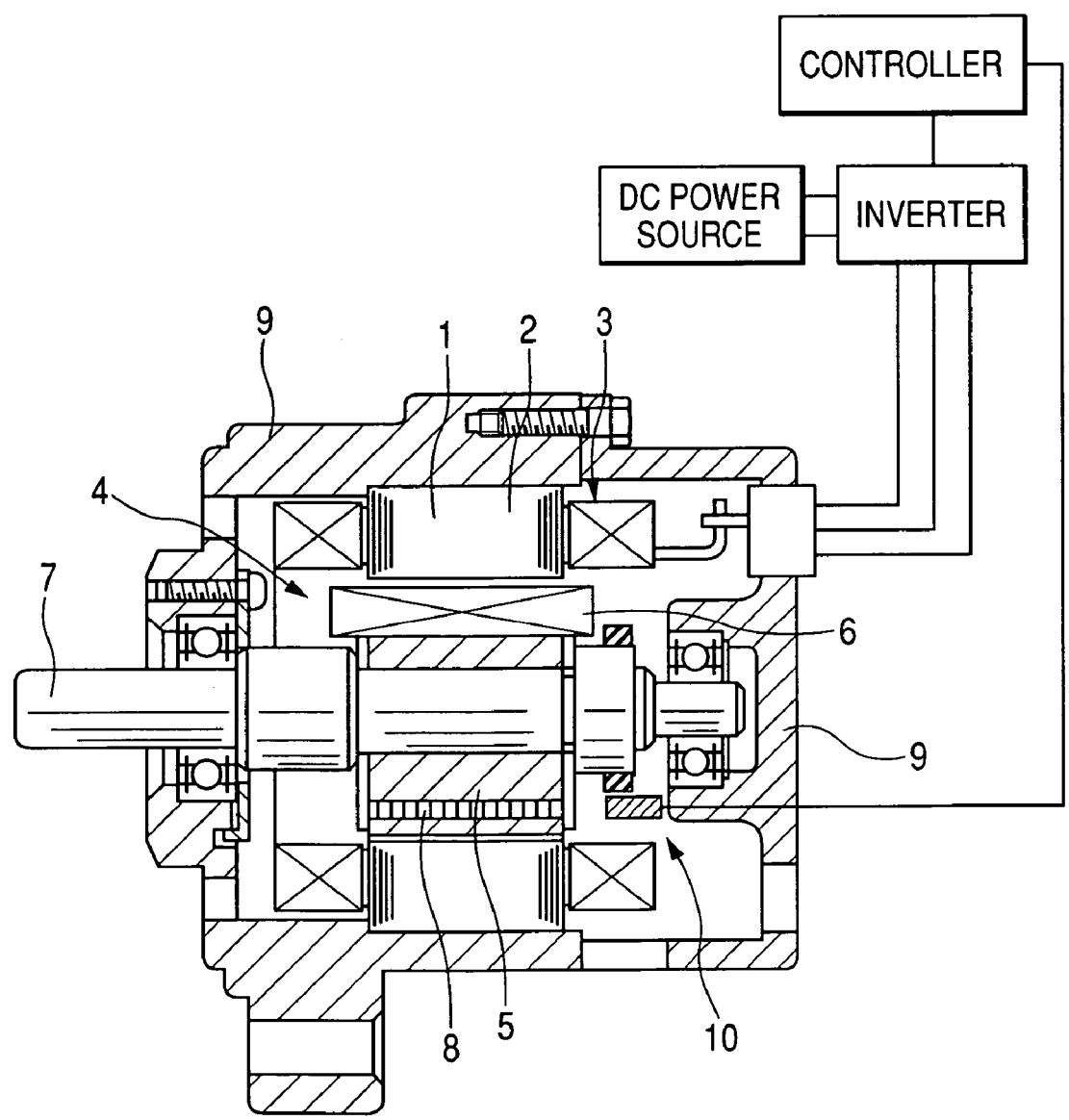
FIG. 12 is a diagrammatic axial cross section illustrating an arrangement of a field-winding type of synchronous machine using armature-winding power supply technique, according to a ninth embodiment of the present invention.

With reference to FIG. 12, a field-winding type of synchronous machine using armature-winding power supply technique according to a ninth embodiment is described below. The synchronous machine illustrated in FIG. 12 is different from the synchronous machine of the first embodiment illustrated in FIGS. 1 and 2, in that the rotor winding (field winding) 6 and the permanent magnet 8 are embedded in the rotor core 5.

Figure 13:
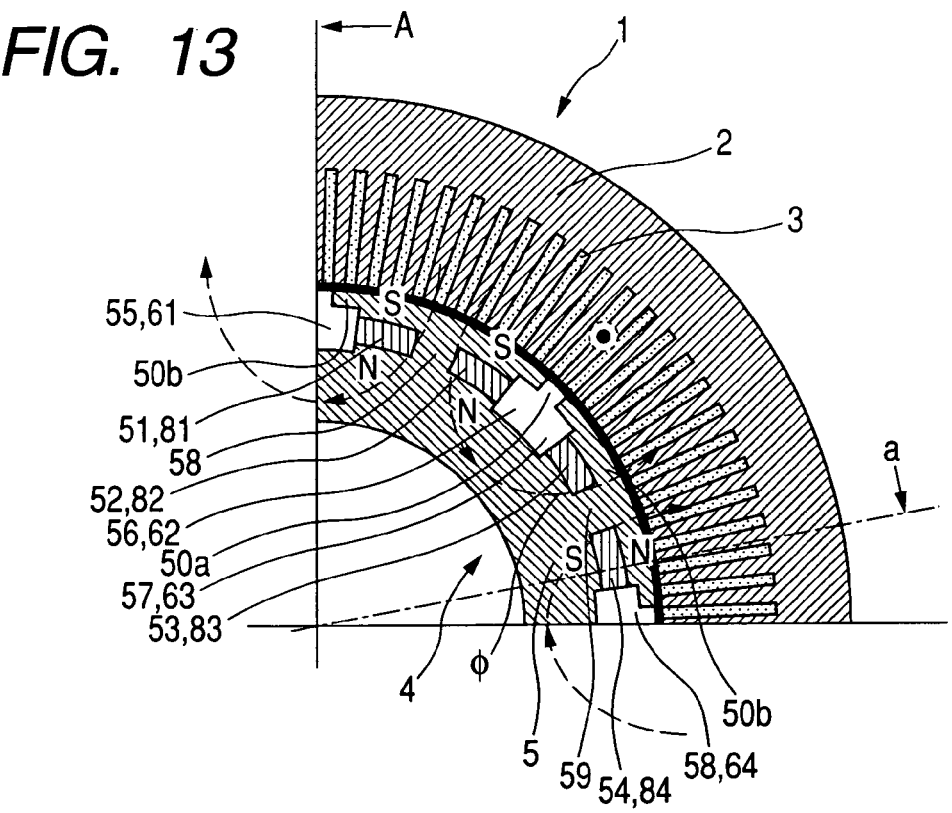
FIG. 13 is a partial radial cross section illustrating an arrangement of the field-winding type of synchronous machine using armature-winding power supply technique, according to the ninth embodiment.

FIG. 13 illustrates a radial cross section of the stator 1 and the rotor 4. FIG. 12 illustrates a diagrammatic axial cross section of the field-winding type of synchronous machine (motor). The stator winding 3 has three-phase windings. The controller 40 intermittently controls the inverter 20 so that the armature current corresponding to the rotational position of the rotor 4, which has been derived from the rotational position sensor 10, is supplied to the stator winding 3. As described above, the rotor exciting current, which does not synchronize with the rotation of the rotor, is superimposed on the stator winding 3 to effect diode rectification to the AC voltage that has been induced to the rotor windings 61-64.

The rotor core 5 of the rotor 4 is provided with magnet accommodating holes 51-54 and field winding accommodating grooves 55-58 in close proximity of the outer peripheral surface of the rotor core 5. A beam portion 58, which is a portion of the rotor core 5, is radially provided between the magnet accommodating holes 51, 52 which are adjacent to each other along the circumference. A beam portion 59, which is a portion of the rotor core 5, is radially provided between the magnet accommodating holes 53, 54 which are adjacent to each other along the circumference. The outermost peripheries of the beam portions 58, 59 cover the outer periphery of the magnet accommodating holes 51-54, and are joined to a flange portion 50b extending in both directions of the circumference to narrow an opening 50a provided at the outer periphery of the field winding accommodating grooves 55-58.

In the present embodiment, the magnet accommodating hole 51 is circumferentially adjacent to the field winding accommodating groove 55 to communicate with each other. Similarly, the magnet accommodating hole 52 is circumferentially adjacent to the field winding accommodating groove 56 to communicate with each other, the magnet accommodating hole 53 is circumferentially adjacent to the field winding accommodating groove 57 to communicate with each other, and the magnet accommodating hole 54 is circumferentially adjacent to the field winding accommodating groove 58 to communicate with each other. Permanent magnets 81-84 are separately accommodated in the magnet accommodating holes 51-54. The permanent magnets 81, 82 are magnetized as S poles on the outer peripheral sides, and as N poles on the inner peripheral sides. The permanent magnets 83, 84 are magnetized as N poles on the outer peripheral sides, and as S poles on the inner peripheral sides. The permanent magnets 81-84 as a whole constitute the permanent magnet 8 in FIG. 12. The rotor winding 6, i.e. the field winding, is wound about the field winding accommodating grooves 55-58. The field winding accommodating grooves 55, 58 separately accommodate outward turns 61, 64 of the rotor winding 6, and the field winding accommodating grooves 56, 57 separately accommodate inward turns 62, 63 of the rotor winding 6. Any type of winding can be used for the rotor winding 6, such as square-shaped winding and serpentine winding. Indicated by Φ is a field flux as shown by a broken line in FIG. 13. The field flux Φ is formed by the permanent magnets 81-84 and the current (field current) of the rotor winding.

Basic operation is the same as the embodiment illustrated in FIG. 11. Since the rotating field produced by the three-phase AC current passing through the stator winding 3 has the same rotational speed as the rotor 4, no AC voltage is induced to the rotor winding 6. When no rotor exciting current is supplied to the stator winding 3, no field current is induced to the rotor winding 6, and a portion of the flux of the permanent magnets 81-84 is short-circuited by the beam portions 58, 59 so as not to interlink with the stator winding 3, thereby limiting torque that much. On the other hand, when the rotor exciting current is supplied to the stator winding 3, field current is induced to the rotor winding 6 to cause the permanent magnets 81-84 to produce a current field in the beam portions 58, 59 in the direction opposite to the flux directed to the beam portions 58, 59. Then, the flux of the permanent magnets 81-84 that have been bypassed via the beam portions 58, 59 is directed to the stator 1 to increase torque. When the rotor exciting current is further increased in the same direction, the field flux formed by the rotor winding 6 and interlinks with the stator winding 3 is increased to further increase torque. Contrarily, when the rotor exciting current is inversely directed, the field flux interlinking with the stator winding 3 is significantly reduced.

The flange portion 50b can increase reluctance torque. Specifically, the flange portion 50b increases reluctance torque as a q-axis magnetic path, and supports the permanent magnets 81-84 and the rotor windings 61-64 against the centrifugal force.

In the present embodiment, the winding space of the rotor has a grooved shape. However, another method may be provided in which segments are inserted into the rotor along the axial direction, followed by welding for connection to form a winding with the opening in the surface of the rotor being closed.

Tenth Embodiment

Figure 14:
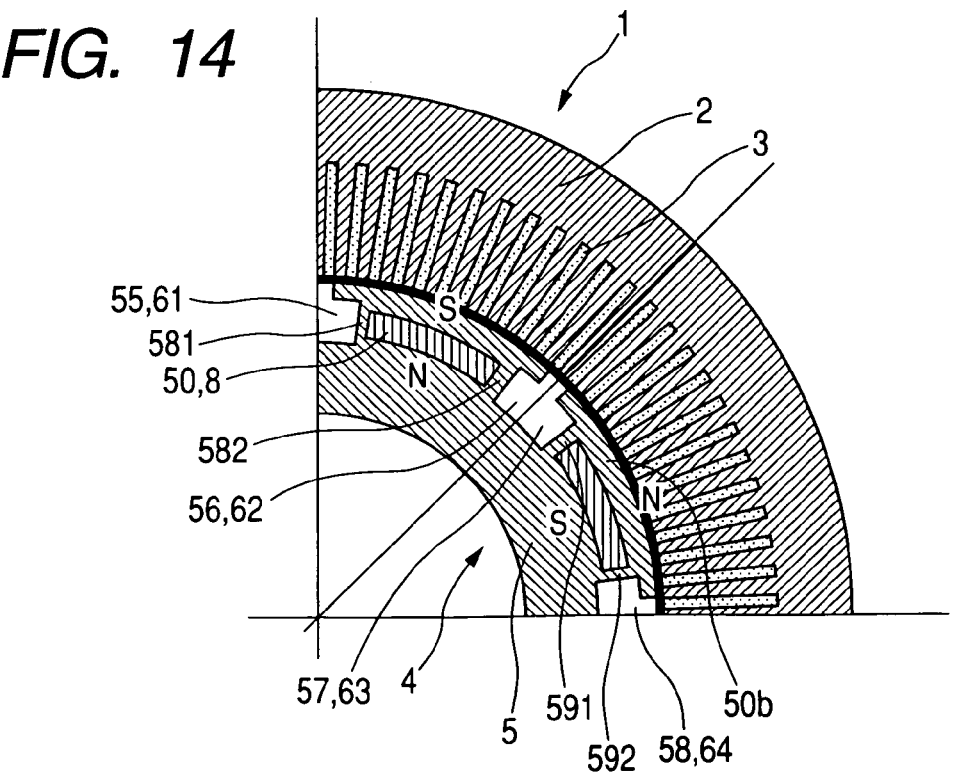
FIG. 14 is a partial radial cross section illustrating an arrangement of a field-winding type of synchronous machine using armature-winding power supply technique, according to a tenth embodiment of the present invention.

With reference to FIG. 14, a field-winding type of synchronous machine using armature-winding power supply technique according to a tenth embodiment is described below. FIG. 14 is a partial radial cross section of the field-winding type of synchronous machine (motor). Tile synchronous machine illustrated in FIG. 14 is different from the synchronous machine of the ninth embodiment in that beam portions 581, 582 are provided instead of the beam portion 58, and beam portions 591, 592 are provided instead of the beam portion 59, and that the magnet accommodating holes 51, 52 are integrated to accommodate one permanent magnet 8 therein, and the magnet accommodating holes 53, 54 are integrated to accommodate one permanent magnet 8 therein. Flux flow in the present embodiment is analogous to that shown in FIG. 11 rather than that shown in FIG. 13. In the present embodiment, reluctance torque can also be expected to increase because the beam portions 581, 582, 591 and 592 are located approximate to the q-axis to reduce magnetic resistance of the q-axis.

Eleventh Embodiment

Figure 15:
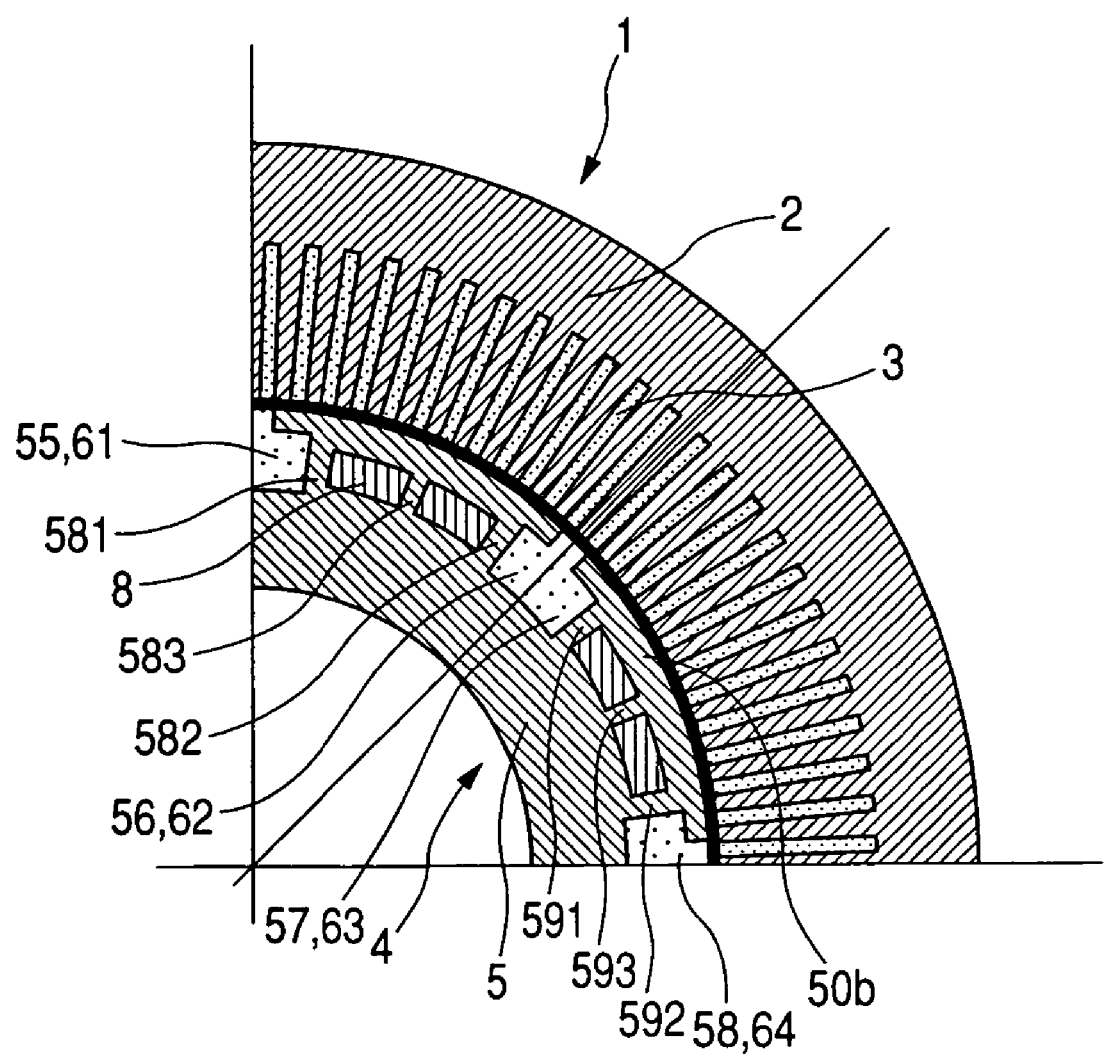
FIG. 15 is a partial radial cross section illustrating an arrangement of a field-winding type of synchronous machine using armature-winding power supply technique, according to an eleventh embodiment of the present invention.

With reference to FIG. 15, a field-winding type of synchronous machine using armature-winding power supply technique according to an eleventh embodiment is described below. FIG. 15 is a partial radial cross section of the field-winding type of synchronous machine. The synchronous machine illustrated in FIG. 15 incorporates therein both the beam structure of the ninth embodiment illustrated in FIG. 13 and the team structure of the tenth embodiment illustrated in FIG. 14. Thus, the beam portions 581-583 and 591-593 are used.

Twelfth Embodiment

Figure 16:
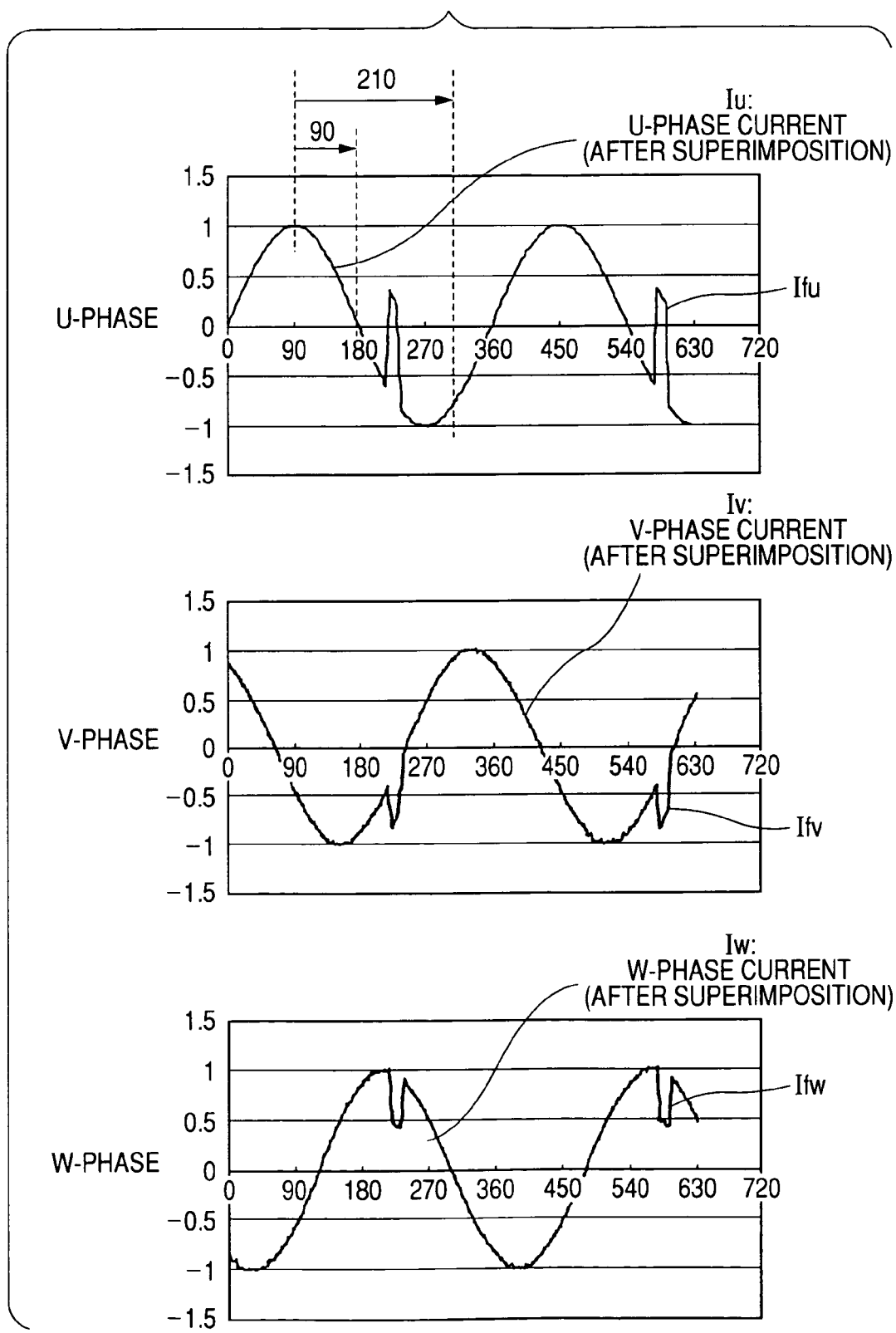
FIG. 16 shows waveform diagrams of exemplary waveforms of composite phase current of a field-winding type of synchronous machine using armature-winding power supply technique, according to a twelfth embodiment of the present invention.
Figure 17:
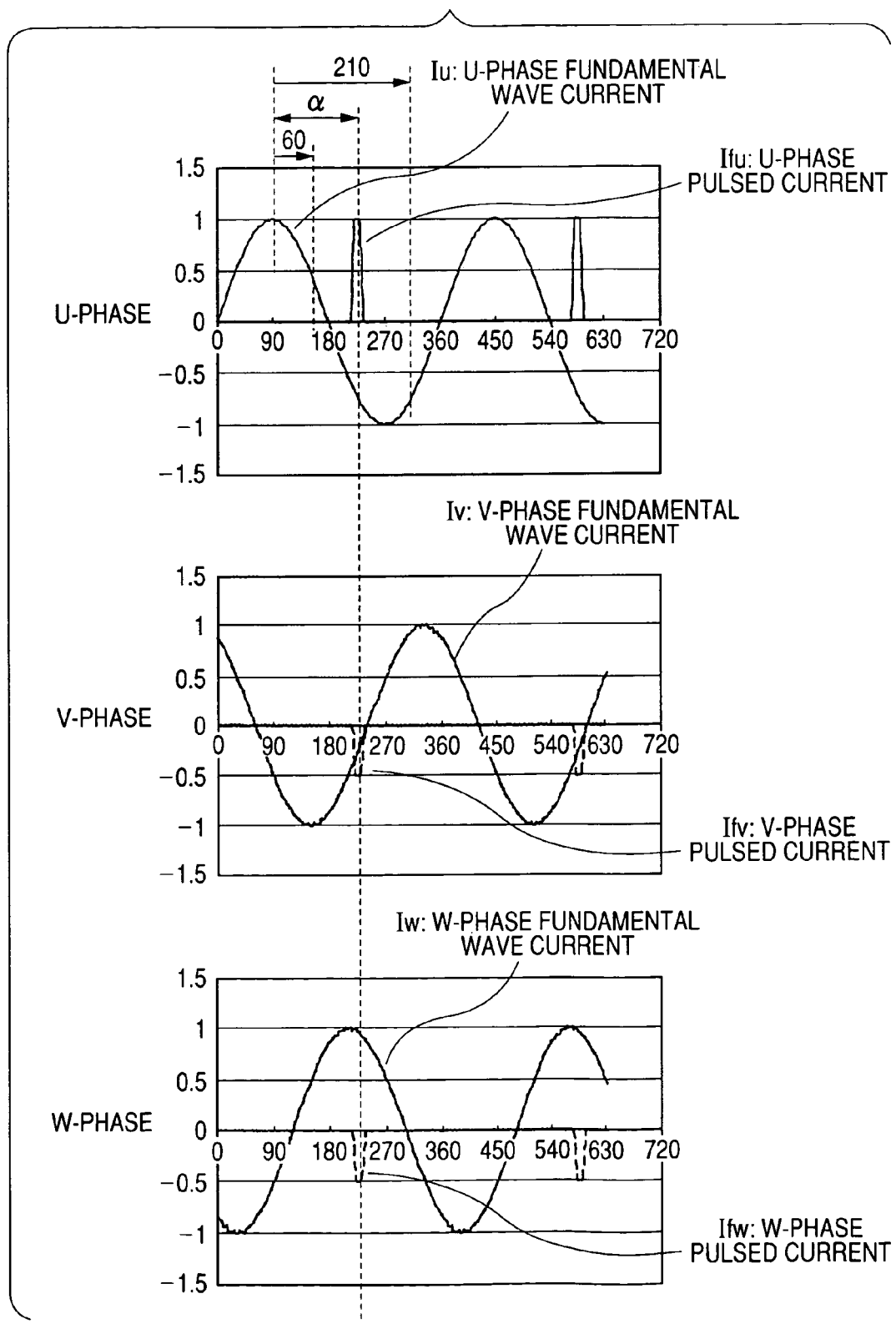
FIG. 17 shows waveform diagrams of exemplary waveforms of discrete phase current of the field-winding type of synchronous machine using armature-winding power supply technique, according to the twelfth embodiment.

With reference to FIGS. 16 and 17, a twelfth embodiment is described below. FIG. 16 shows waveform diagrams of composite phase current waveforms, in which pulsed rotor exciting currents Ifu, Ifv, Ifw are superimposed on respective phase currents Iu, Iv, Iw, i.e. three-phase sine-wave currents, of the stator winding 3. FIG. 17 shows waveform diagrams in which the individual phase currents Iu, Iv, Iw are indicated separately from the rotor exciting currents Ifu, Ifv, Ifw.

As a matter of course, these phase current waveforms are formed by the inverter 20. In the figure, Iu is a phase current supplied to the U-phase winding, Iv is a phase current supplied to the V-phase winding, and Iw is a phase current supplied to the W-phase winding. The phase currents Iu, Iv, Iw are sine-wave currents (multiphase AC currents referred to herein) in synchronization with the rotation of the rotor.

The rotor exciting currents Ifu, Ifv, Ifw are supplied for a predetermined phase period β from a time point which is delayed from a maximum point of the positive amplitude (peak phase angle) of the U-phase current Iu, by a predetermined phase angle α. Thus, the pulsed rotor exciting current Ifu is superimposed on the phase current Iu, the pulsed rotor exciting current Ifv is superimposed on the phase current Iv, and the pulsed rotor exciting current Ifw is superimposed on the phase current Iw. Accordingly, a formula Ifu+Ifv+Ifw=0 is established.

Figure 18:
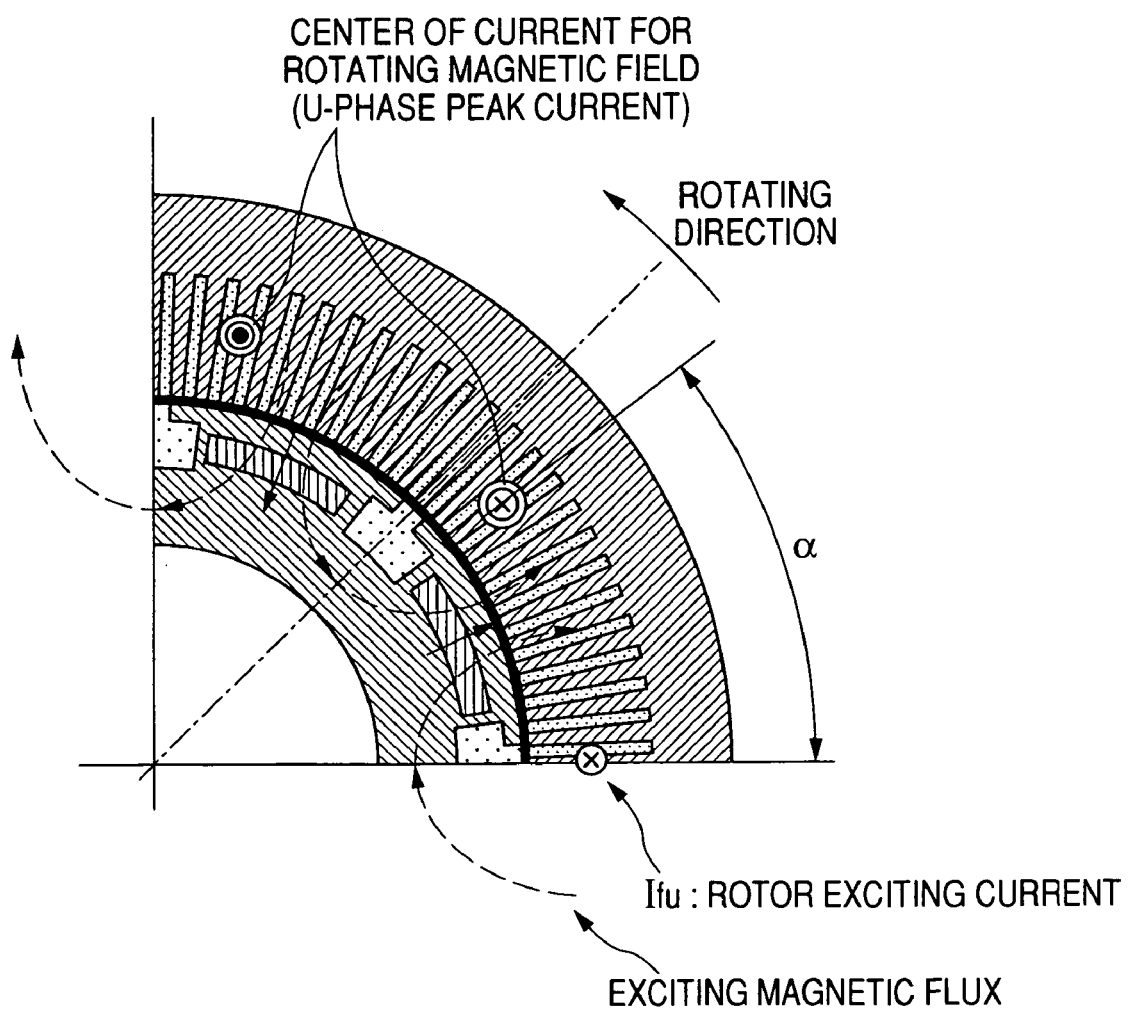
FIG. 18 is a schematic diagram illustrating a phase relation between rotor exciting current and sine-wave phase current waveforms in the field-winding tyke of synchronous machine using armature-winding power supply technique, according to the twelfth embodiment.

With reference to FIG. 18, setting of α and β, when applied to an IPM motor, is described. Assuming a case where a center of the rotating field current of the stator matches an angular position of a peak of the U-phase current, the setting of α and β is described. FIG. 18 shows a positional relation between the current at the center of the rotating field and the excitation current. In the IPM motor, from the viewpoint of torque performance, the center of the rotating field current should preferably be brought to a phase which is 30-60 degrees ahead of the center of the rotor field.

In FIG. 18, since the center of the rotor field is at a position which is 90 electrical degrees (π/2) ahead of the q-axis, if the rotor exciting current Ifu is supplied to the q-axis along the same direction as the center of the rotating field current, the excitation flux can be increased. The rotor exciting current Ifu only has to form a flux within a pole arc ratio (typically about 0.7), and thus, in effect, should be set within the range of from −60 to +60 degrees to realize the rotor exciting function. It may be appreciated that the phase angle α between the center of rotating field (maximum amplitude of maximum phase current) and the rotor exciting current Ifu should be set by adding a redundancy of the excitation current to 120-150 degrees, i.e. should be set at 60-210 degrees. It should be noted that the q-axis here refers to an axis which is 90 degrees delayed in a rotational direction from the center of the magnetic field which is oriented to the direction along the outer diameter.

The superimposition condition of the pulsed rotor exciting current Ifu on the fundamental wave components of the individual phase currents, in particular, their phase relationship, is shown in FIG. 17, and compositions of the both, i.e. the composite phase current waveforms of the individual phases, are shown in FIG. 16. The amplitude of the excitation current can be made maximum by setting the phase angle α within a range of 60-210 degrees. It should be noted that, in FIG. 18, the direction piercing from the upper surface of the drawing page to the reverse side is rendered to be positive. As to β, it is limited by the rotational speed and the period for supplying current. In case of driving automobiles, for example, 50-5000 rpm with about 4 pole pairs is generally specified for use, and a suitable period for supplying current ranges from about 50 μs to about 0.5 ms to decrease, as much as possible, the energy required for excitation and the loss. To satisfy these requirements, β may preferably be set at 0.1-60 degrees.

Briefly, the amplitude of the pulsed rotor exciting current is the largest in the U-phase current Iu in which the amplitude value of the rotor exciting current is the largest in the positive direction. With this largest amplitude rotor exciting current, the U-phase current Iu is superimposed in a manner to decrease its amplitude. The sum of the rotor exciting currents superimposed on the V-phase current Iv and the W-phase current Iw is equal to the U-phase current Iu, but the direction of superimposition is inverted. In the present embodiment, the amplitude of the V-phase current Iv substantially equals to that of the W-phase current Iw, however, there may be about 0.7-1.5 times a difference therebetween. The superimposition of the rotor exciting currents supplies required electric power to the field winding.

In a salient-pole motor only provided with a field winding without having magnets, it is suitable, from a viewpoint of torque performance, that a circumferential center position of a rotating field current is set at a phase which is ahead of the center of the rotor flux by −30 to 10 degrees.

In this salient-pole motor having only a field winding, the circumferential center position of the field magnetic poles of the rotor is also located at a position which is 90 electrical degrees (π/2) ahead of the q-axis. Therefore, by supplying the rotor exciting current Ifu to the q-axis in the same direction as the center of the rotating field current, the excitation flux can be increased. Preferably, the rotor exciting current Ifu should form the flux within the pole arc ratio (typically about 0.7). In other words, the rotor exciting function can be realized by setting the circumferential center position of the rotating field current within a range of from −60 to +60 degrees. Specifically, the phase angle α between the center of rotating field (maximum amplitude of maximum phase current) and the rotor exciting current Ifu should be set by adding a redundancy of the excitation current to 60-100 degrees, i.e. should be set at 0-160 degrees.

(Modifications)

Figure 19:
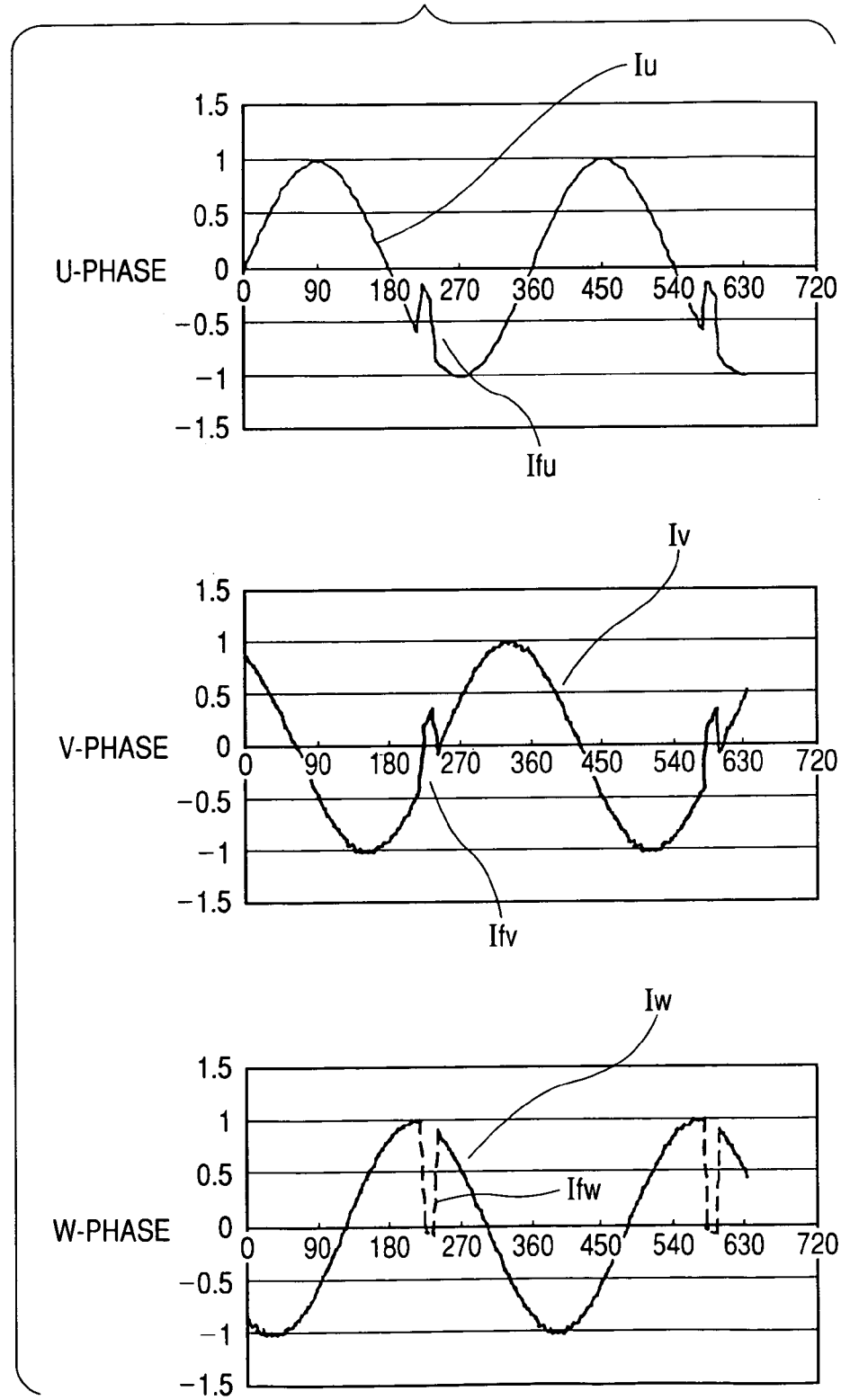
FIG. 19 shows waveform diagrams of a modification of a thirteenth embodiment of the present invention.

As shown in FIG. 19, the amplitude of the rotor exciting current Ifu, which is to be superimposed on the U-phase current Iu and has the largest amplitude value, may be made smaller than the amplitude of the rotor exciting current Ifv or Ifw to be superimposed on other phase currents.

In the above embodiment, the rotor exciting current Ifu having the largest amplitude has been superimposed on the U-phase current Iu at the time point which is delayed from the maximum positive amplitude of the U-phase current Iu by the predetermined phase angle α. Alternatively, the rotor exciting current Ifv having the largest amplitude may be superimposed on the V-phase current Iv at the time point which is delayed from the maximum positive amplitude of the V-phase current Iv by the predetermined phase angle α. Alternatively, the rotor exciting current Ifw having the largest amplitude may be superimposed on the W-phase current Iw at the time point which is delayed from the maximum positive amplitude of the W-phase current 1w by the predetermined phase angle α.

Among the phase periods in the individual phase currents Iu, Iv and Iw, there are specific phase periods which have less contribution to torque generation. Thus, if the rotor exciting currents are superimposed on the phase currents in these periods, torque ripple may be decreased.

In the above embodiment, the rotor exciting currents of a pulse voltage waveform or a substantially rectangular waveform have been supplied during the phase period β. Instead, the rotor exciting current having a waveform of high-frequency AC current may be supplied.

Thirteenth Embodiment

Figure 20:
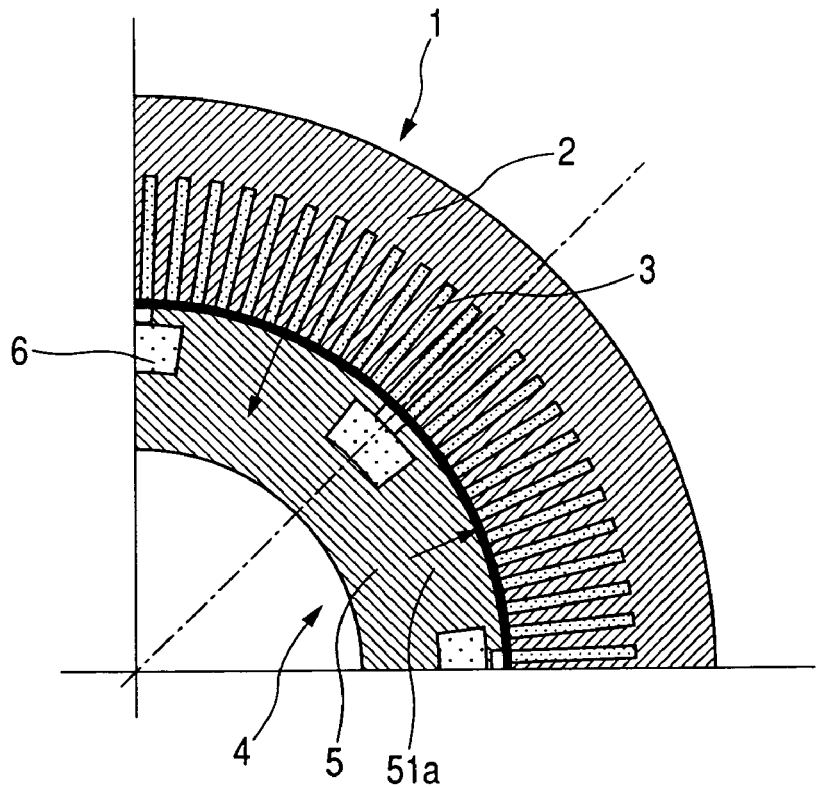
FIG. 20 is a partial radial cross section of a short-circuit winding type synchronous machine to show the thirteenth embodiment.
Figure 21:
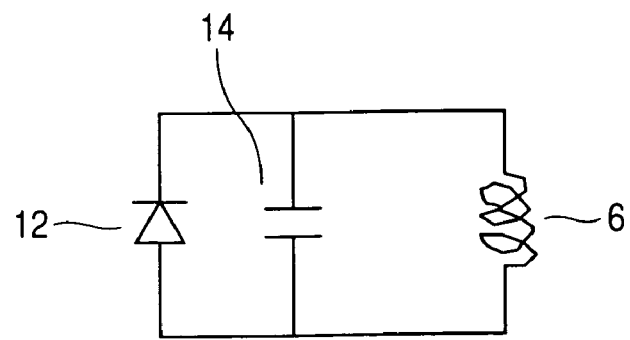
FIG. 21 is a circuit diagram of the short-circuit winding type synchronous machine illustrated in FIG. 20 as viewed from a rotor side.

With reference to FIGS. 20 to 26, a thirteenth embodiment will now be described. FIG. 20 shows a radial cross section of the stator 1 and the rotor 4 illustrated in FIG. 1. In the present embodiment, grooves (which may be holes) in which the rotor winding (short-circuit winding) 6 is substantially embedded are formed in the vicinity of an outer peripheral surface of the rotor core 5 of the rotor 4. As shown in FIG. 21, the rotor winding 6 is short-circuited via the diode 12. Indicated by 14 is the current smoothing capacitor. The diode 12 effects half-wave rectification to the AC voltage which is induced to the rotor winding 6, so that one counterpart of a pair of rotor core teeth portions 51a is excited as an N pole, and the other counterpart, as an S pole.

A unidirectional induction current passing through the rotor winding 6 forms field flux in the rotor winding 6 in the directions shown by the arrows in FIG. 20. This field flux is formed at the rotor core teeth portions 51a enclosed by the rotor winding 6, in the outer periphery of the rotor core 5. Thus, in the present embodiment, although the rotor winding 6 is wound about each of the rotor core teeth portions 51a in a concentrated manner to have a shape of square, serpentine winding may also be provided.

Figure 22:
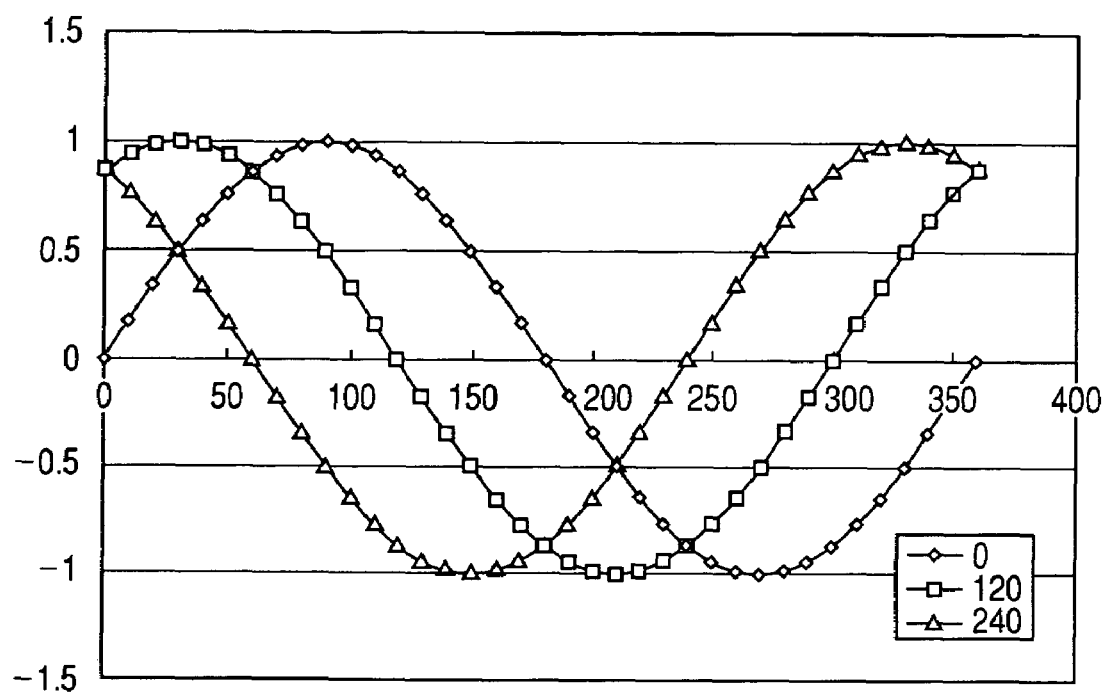
FIG. 22 is a waveform diagram of three-phase armature voltage, before superimposition, of the short-circuit winding type synchronous machine illustrated in FIG. 20.
Figure 23:
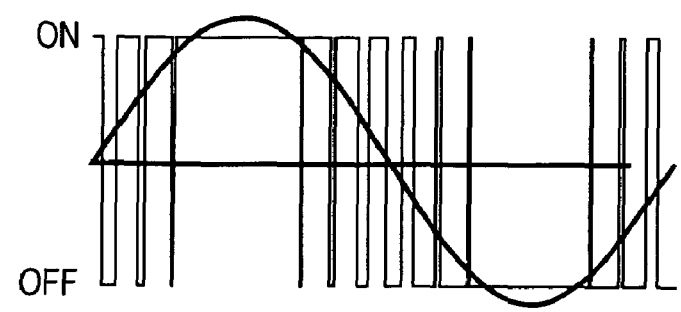
FIG. 23 is a waveform diagram of a PWM (pulse-width modulated) phase voltage in one phase.

In this embodiment, the inverter 20 supplies a special AC current (rotor exciting current) to the stator winding 3 in order to induce the AC voltage to the rotor winding 6. Accordingly, the three-phase armature current flowing through the stator winding 3 is the sum of three-phase synchronizing current (multiphase current referred to herein), i.e. current components for generating torque, and rotor exciting current. Armature voltage to be applied to the stator winding 3 is the sum of three-phase AC voltage, i.e. voltage components for generating torque, and rotor exciting voltage, i.e. voltage components for generating the rotor exciting current. Waveforms of the conventional three-phase armature current are shown in FIG. 22, and one PWM (pulse width modulated) phase voltage waveform is shown in FIG. 23. FIG. 22 diagrammatically illustrates the current flowing through the stator winding, and FIG. 23 shows a voltage waveform at the time of overmodulation (Detailed Description on Superimposition of the Rotor Exciting Voltage)

Figure 24:
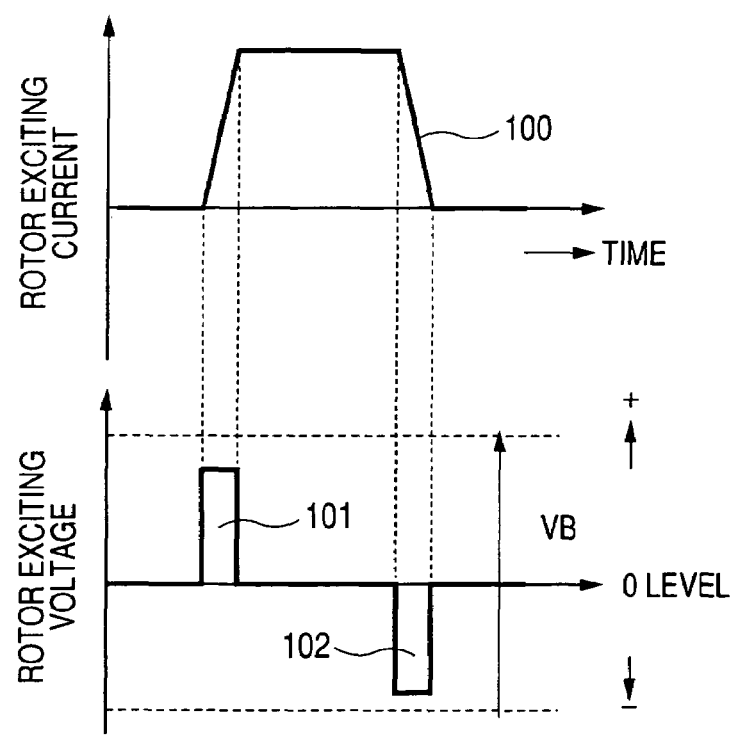
FIG. 24 is waveform diagrams of rotor exciting current and rotor exciting voltage for superimposition.

With reference to FIG. 24, hereinafter is described a method for superimposing the rotor exciting voltage in the present embodiment. In the present embodiment, pulsed current is supplied to the rotor winding 6 during predetermined phase periods of the three-phase AC current for generating torque to induce voltage to the rotor winding 6. The induced voltage is then subjected to diode rectification to unidirectionally supply an excitation current to the rotor winding 6.

In FIG. 24, indicated by 100 is a waveform of the rotor exciting current to be superimposed on the stator winding 3. In order to supply the pulsed rotor exciting current 100 to the stator winding 3, the stator winding 3 is required to be applied with positive pulse voltage 101 and negative pulse voltage 102 whose polarity is different from each other. VB indicates a battery voltage width.

Figure 25:
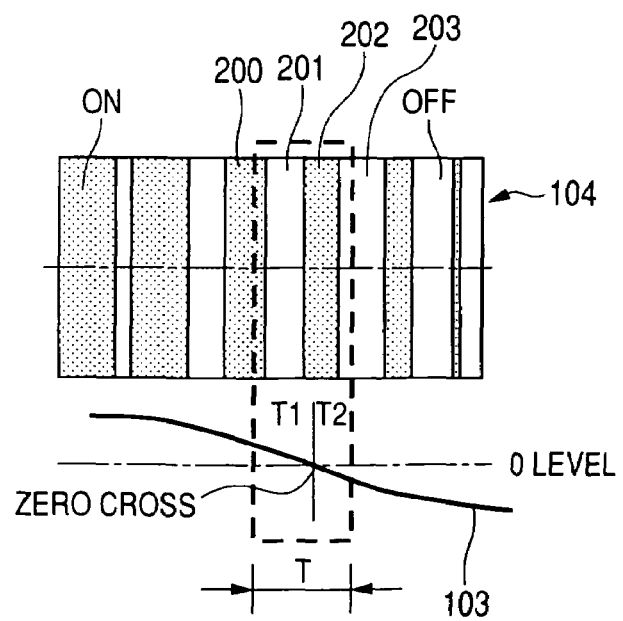
FIG. 25 shows a PWM phase voltage in one phase (before superimposition)
Figure 26:
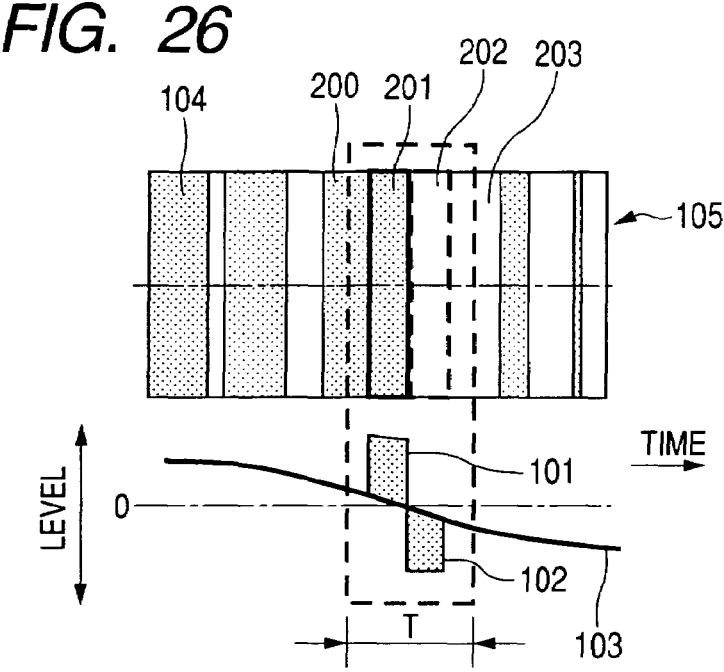
FIG. 26 shows a PWM phase voltage in one phase (after superimposition)

In FIG. 25, indicated by 104 is a PWM phase voltage of one phase for forming sine-wave phase voltage 103 of one phase, by 200, 202 are on-state periods of the PWM phase voltage, and by 201, 203 are off-state periods of the PWM phase voltage. With reference to FIG. 26, a method for well superimposing the positive pulse voltage 101 and the negative pulse voltage 102 on the PWM phase voltage 104 of one phase.

Referring to FIG. 26, in a period T for superimposing the rotor exciting voltage, which is set in the proximity of zero level of a sine-wave phase voltage 103 of one phase, an off-state period 201 of a PWM phase voltage 104 of one phase is converted to an on-state period in a phase period T1 in which the sine-wave phase voltage 103 of one phase presents positive values, and an on-state period 202 of a PWM phase voltage 104 of one phase is converted to an off-state period in a phase period T2 in which the sine-wave phase voltage 103 of one phase presents negative values. Thus, the positive pulse voltage 101 is superimposed on the phase period T1, and the negative pulse voltage 102 is superimposed on the phase period T2. PWM phase voltage of other two phases can be formed in the similar manner. In this way, PWM pulse waveforms in proximity to zero level (zero cross) of the sine-wave phase voltage 103 of one phase can be inverted, which leads to an increase of the pulse width of the positive pulse voltage 101 and the negative pulse voltage 102, and, by allowing both widths to be substantially equal to each other, also leads to a decrease of waveform disturbance of the PWM three-phase AC voltage. Further, the pulsed rotor exciting voltage can be superimposed on the PWM three-phase AC voltage, while suppressing the increase in the number of times of switching of the PWM voltage. In other words, in the present embodiment, the on-state period and the off-state period of the PWM three-phase AC voltage for forming the three-phase AC voltage are inverted, so that the positive pulse voltage 101 and the negative pulse voltage 102 are readily superimposed on the three-phase AC voltage. Thus, an apparatus can be realized without substantially changing the circuit arrangements of typical brushless DC motors. According to the pulse inversion described above, the armature voltage, which is the sum of the three-phase AC voltage (effective value) and the rotor exciting voltage (effective value) does not exceed the maximum value of the three-phase AC voltage (effective value), by which the amplitude of the three-phase AC voltage (effective value) can be set at a high level within an allowable range of the power source voltage.

Since the formation of such a composite PWM voltage 105 can be fairly readily performed by the controller 40 which is made up of a microcomputer or a digital circuit, particular description referring to drawings is omitted here. For example, the rotor exciting voltage may be defined by a positive pulse voltage which transits between a logical value zero corresponding to a zero value level and logical value 1 corresponding to a positive value level, and defined by a negative pulse voltage which transits between a logical value 1 corresponding to a zero value level and logical value zero corresponding to a negative value level, and subsequently, the positive pulse voltage may be logically added to the PWM phase voltage, and the negative pulse voltage may be logically multiplied by the PWM phase voltage.

(Modifications)

Figure 27:
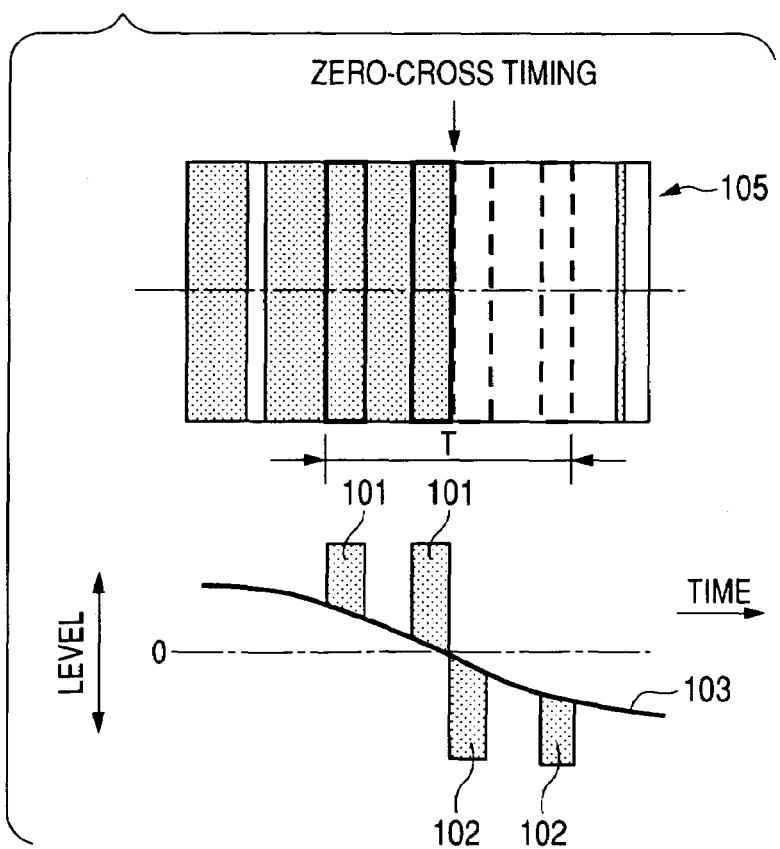
FIG. 27 shows a PWM phase voltage in one phase (after superimposition) of modification of the thirteenth embodiment.

As shown in FIG. 27, in case of applying a rotor exciting voltage having a larger effective value to the stator winding 3, a plurality of off-state periods may be changed to on-state periods before zero-cross timing, and a plurality of on-state periods may be changed to off-state periods after zero-cross timing.

In the above embodiment, the off-state periods have been completely changed to on-state periods before zero-cross timing, and the on-state periods have been completely changed to the off-state periods after zero-cross timing. Instead, the off-state periods may be partially changed to on-state periods by extending the on-state periods before zero-cross timing, and the on-state periods may be partially changed to the off-state periods by extending the off-state periods after zero-cross timing.

Figure 28:
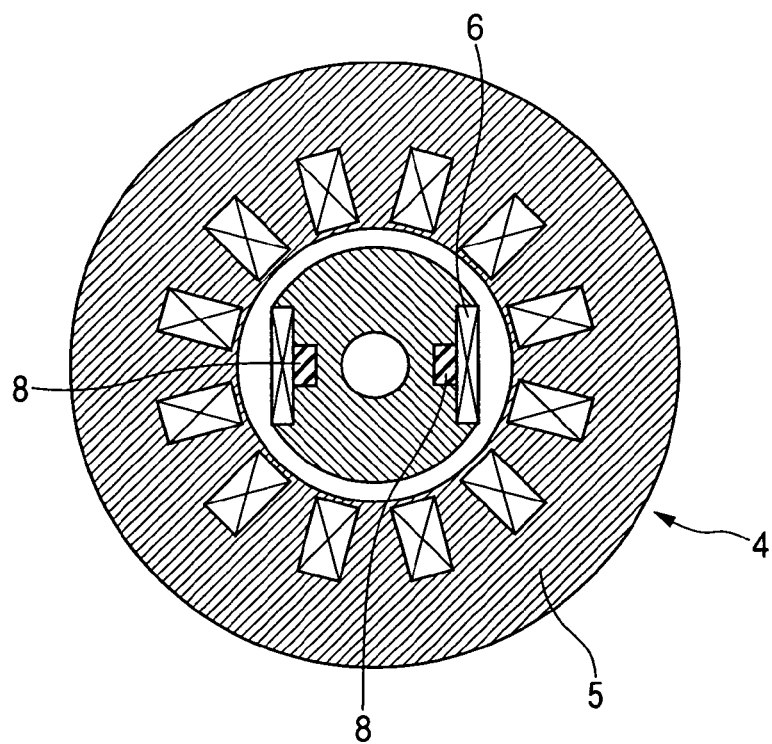
FIG. 28 is a partial radial cross section illustrating an arrangement of a rotor structure of a modification of the thirteenth embodiment.

FIG. 28 diagrammatically illustrates an example in which magnets have been added to the rotor 4 illustrated in FIG. 20. With this arrangement, field flux can be composed by the magnetic flux and the field current flux formed at the rotor winding 6.

(Advantages)

According to the embodiments described above, excitation current can be supplied to the rotor winding 6 without using a brush or a rotary transformer. Further, since an amount of the excitation current can be adjusted by the electric power supplied from the stator winding 3, voltage induced at high-speed rotation can be suppressed, and field weakening for magnetic-field synchronous machines is not needed, thereby enhancing efficiency.

(Results of Simulation)

Results of simulation are described below. In each of the figures, the horizontal axis indicates time.

Figure 29:
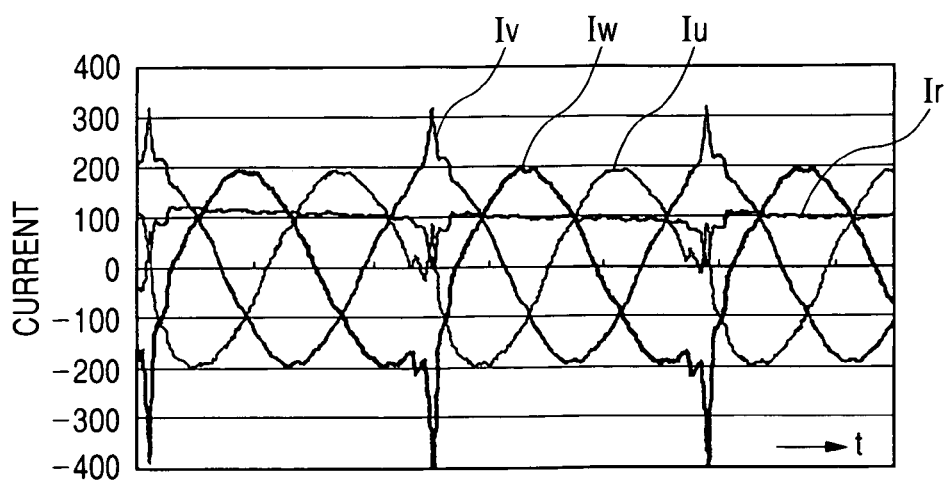
FIG. 29 is a simulated waveform diagram showing composite armature current waveforms of individual phases, which have been obtained by superimposing high-frequency current components for imparting the field winding with an excitation current, upon fundamental wave components (sine wave) of an armature current, and showing waveforms of an excitation current that has been produced on that occasion in the rotor winding.

FIG. 29 is a timing diagram showing composite waveforms of armature currents of individual phases, which have been obtained by superimposing high-frequency current components for imparting the field winding with excitation current upon fundamental wave components (wine waves) of the armature current, and a waveform of the excitation current produced in the rotor winding at the time of superimposition. In the figure, Iu indicates a composite armature current of the U-phase, Iv indicates a composite armature current of the V-phase, Iw indicates a composite armature current of the W-phase, and Ir indicates the excitation current that is a rectified induced current. The excitation current Ir is rectified by the diode and passed through the rotor winding. As can be seen from FIG. 29, the excitation current Ir is passed through the rotor winding by superimposing the pulsed high-frequency components during a short period of one cycle of the fundamental wave components of the armature current of each of the phases.

Figure 30:
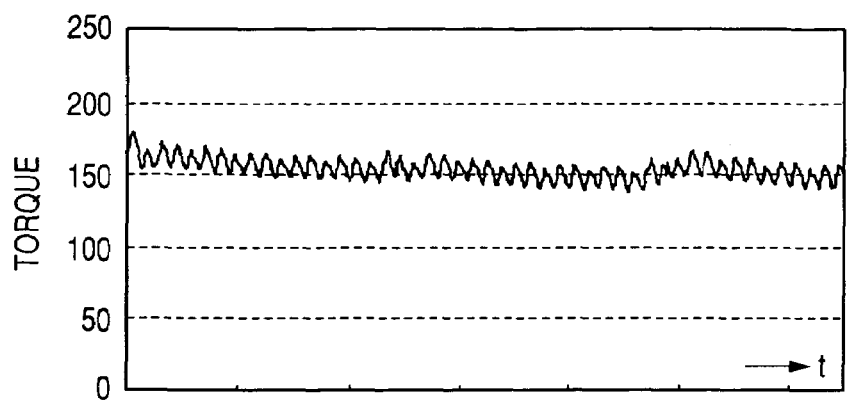
FIG. 30 is a simulated waveform diagram showing torque produced by the excitation current of FIG. 29.

FIG. 30 shows the torque produced by the excitation current Ir shown in FIG. 29. The excitation current Ir was reduced for the period when a pulse excitation was given from the stator, however, since the excitation was given in a pulsed manner, the degree of the torque ripple produced then was very small but of the same degree as the torque ripple caused during the time other than this period. That is, the torque was of a practically allowable level. It was revealed that the torque ripple was relatively smaller than the torque ripple of Japanese Unexamined Patent Application Publication No. 07-095790.

Figure 31:
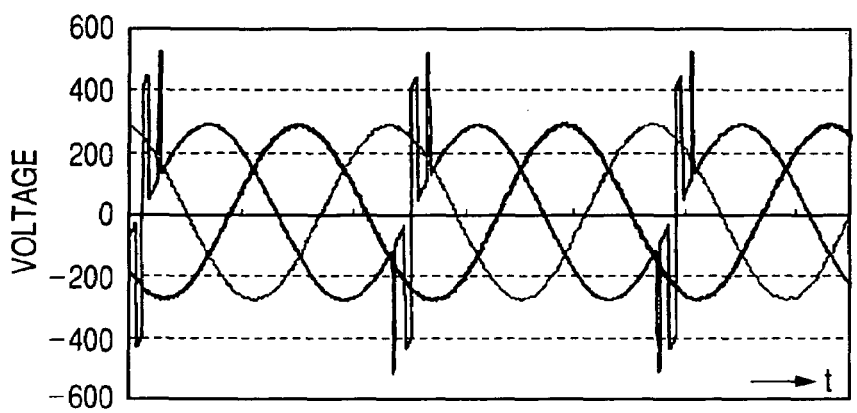
FIG. 31 is a simulated waveform diagram showing a status where high-frequency voltage components have been superimposed on three-phase armature voltage so as to supply the excitation current of FIG. 29.

FIG. 31 is a timing diagram showing a condition in which high-frequency voltage components have been superimposed on the three-phase armature voltage in order to excite the excitation current Ir shown in FIG. 29. Such high-frequency voltage components can be readily formed by PWM control for forming three-phase armature voltage. For clarity, the fundamental wave voltage, here, is shown with effective voltage waveforms.

Figure 32:
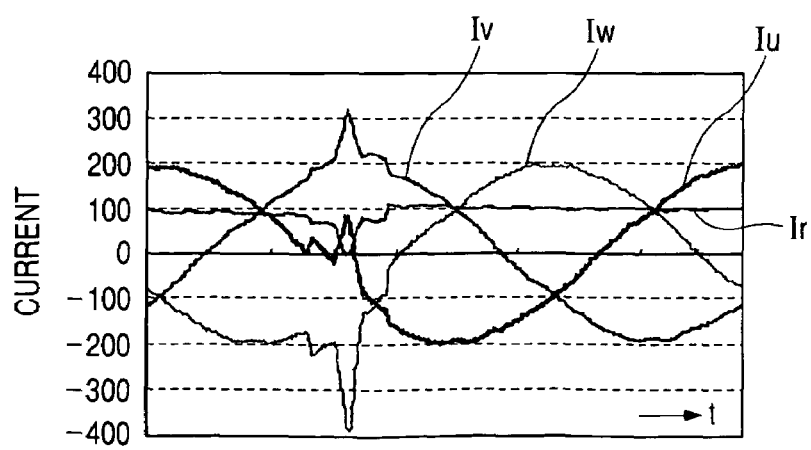
FIG. 32 is a simulated waveform diagram in which approximately one cycle of each of the waveforms of FIG. 29 has been enlarged.
Figure 33:
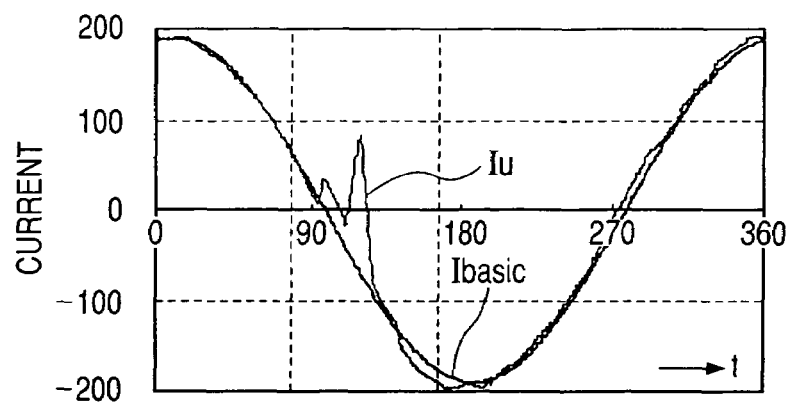
FIG. 33 is a simulated waveform diagram showing the composite armature current of FIG. 29 and its fundamental wave components.
Figure 34:
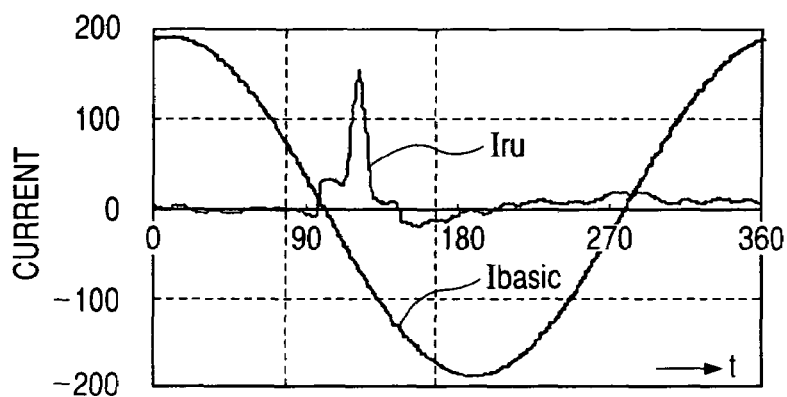
FIG. 34 is a simulated waveform diagram showing the fundamental wave components in a composite armature current Iu, and pulsed high-frequency components (primary excitation current) in the composite armature current Iu.

FIG. 32 shows enlarged waveforms of about one cycle of the individual waveforms shown in FIG. 29. FIG. 33 shows the composite armature current Iu of the U-phase shown in FIG. 32 and its fundamental wave components Ibasic. FIG. 34 shows the fundamental wave components Ibasic in the composite armature current Iu of the U-phase, and pulsed high-frequency components (primary excitation current) Iru in the composite armature current Iu of the U-phase.

If the period for supplying the pulsed high-frequency components (primary excitation current) Iru is ¼ or less of one cycle of the fundamental wave components Ibasic (i.e. $\pi/2$), the influences of the torque ripple can be suppressed to a level which is sufficiently low for practical use. Generally, in this type of armature current control, torque processing with dq rotating coordinate conversion is carried out. However, if the period for supplying the pulsed high-frequency components (primary excitation current) Iru is less than the period of ¼ or less of one cycle, the superimposition can be completed during the time when the d-axis current and the q-axis current are both in one quadrant of the dq rotating coordinate system. Thus, symbols of the d-axis current and the q-axis current do not have to be changed. This means that the torque ripple can be reduced.

Figure 35:
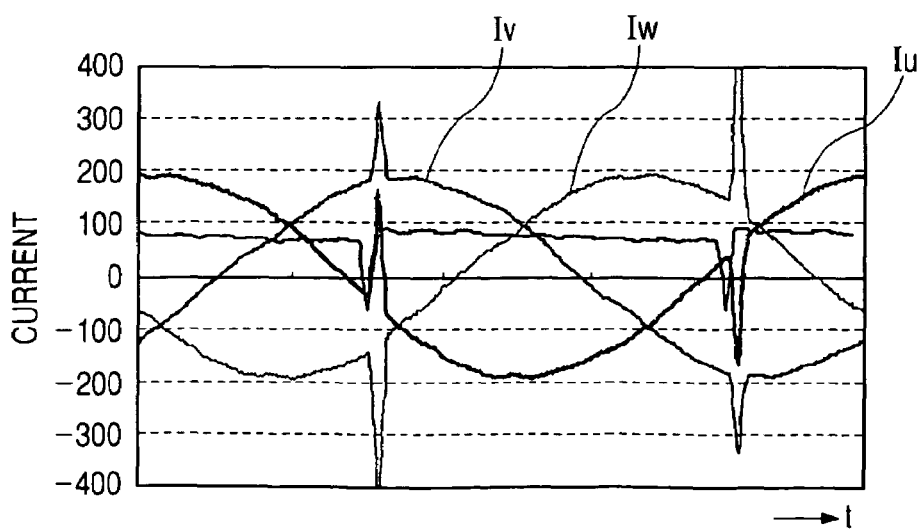
FIG. 35 is a simulated waveform diagram showing a state where the fundamental wave components of the armature voltage of each of the phases have been superimposed by pulsed high-frequency components twice in one cycle the fundamental wave components.
Figure 36:
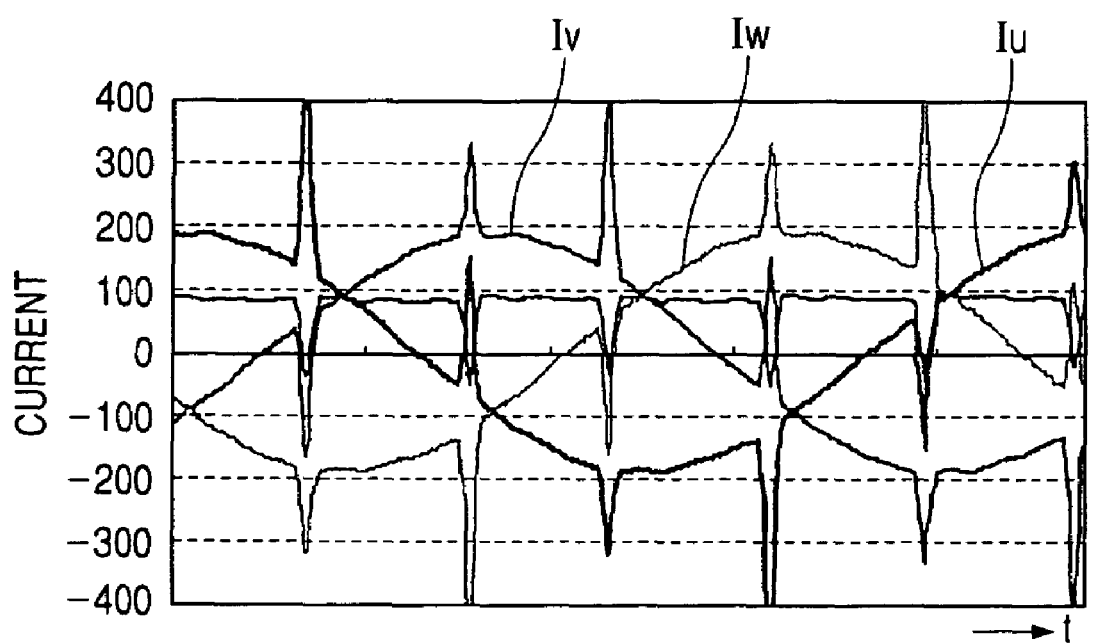
FIG. 36 is a simulated waveform diagram showing three-phase armature voltage waveforms obtained by zero-cross timing superimposition.

Current should preferably be supplied in such a way that the timing for superimposing the pulsed high-frequency components (primary excitation current) upon the fundamental wave components of the armature current coincides with the timing when the vector direction of the pulsed high-frequency components (primary excitation current) matches the direction of the magnetic salient-pole portions (phase angle) on the dq rotating coordinate system. It is understood that, since the rotor has a pair of magnetic salient-pole portions which are apart from each other by an electrical angle $\pi$, and since the field winding which is short-circuited via the diodes is wound about the magnetic salient-pole portions, there are two suitable timings, in the electrical angle $2\pi$, i.e. in one cycle of the armature current of each phase, for superimposing the pulsed high-frequency components. Accordingly, as shown in FIG. 35, it is preferable that the pulsed high-frequency components are superimposed twice upon the fundamental wave components of the armature current of each of the phases during one cycle of the fundamental wave. As shown in FIG. 36, taking into account the armature current for three phases, there are 3 (phases)×2 (twice) superimposition timings in one cycle.

The pulsed high-frequency components should preferably be superimposed upon the fundamental wave components of the armature voltage of each of the phases in proximity to zero-cross timing of the fundamental wave components. This exerts an effect of reducing the amplitude level of the composite armature voltage. This way of superimposition is referred to a zero-cross timing superimposition technique. Waveforms of three-phase armature voltage resulting from this zero-cross timing superimposition technique are shown in FIG. 31. As can be seen, the excitation current of the U-phase is produced in proximity to zero cross.

What is claimed is:

1. A field-winding type of synchronous machine comprising:
    a stator on which an armature winding is wound phase by phase for multiphase excitation;
    a rotor having a rotor core on which a field winding is fixedly wound and being located to be opposed to the stator;
    a power circuit configured to enable an armature current to pass the armature winding in each phase, the armature current being a synchronous current producing a rotation field rotating at an electrical-angle rotation speed agreeing to a rotation speed of the rotor;
    a current suppressor connected to the field winging and configured to suppress, into a unidirectional current, an induced alternating current induced through the field winding in response to the armature current passing the armature winding; and
    a current supplier configured to supply, phase by phase, to the armature winding a rotor exciting current whose waveform is different from the synchronous current only during a predetermined period of time shorter than one cycle of the synchronous current to be supplied through the armature winding.

2. The synchronous machine according to claim 1, wherein the current suppressor electrically connected in series to the field winding.

3. The synchronous machine according to claim 1, wherein the armature current has a fundamental wave component corresponding to the synchronous current.

4. The synchronous machine according to claim 3, wherein the rotor exciting current is different in frequency from the synchronous current.

5. The synchronous machine according to claim 4, wherein the rotor exciting current changes at a speed which is four or more times larger than a change speed of the synchronous current to be fed into each phase.

6. The synchronous machine according to claim 4, wherein the rotor exciting current includes an alternating current whose frequency is higher than the synchronous current to be supplied through the armature winding for each phase.

7. The synchronous machine according to claim 4, further comprising an inverter supplying not only the synchronous current to the armature in accordance with a rotation angle of the rotor but also the rotor exciting current.

8. The synchronous machine according to claim 7, wherein the predetermined period of time shorter than the one cycle of the synchronous motor is set to ¼ or less of the one cycle on which the fundamental component of the synchronous current is supplied.

9. The synchronous machine according to claim 4, comprising a rectifier rectifying currents to be generated by the armature winding, wherein the rotor exciting current is mixed with the generated current.

10. The synchronous machine according to claim 3, wherein the current suppressor includes a rectifier half-wave rectifying the induced alternating current.

11. The synchronous machine according to claim 10, wherein the current supplier is configured to supply the rotor exciting current during a period of phase time having a predetermined current amplitude other than a remaining period of phase time having a current amplitude larger than the predetermined current amplitude.

12. The synchronous machine according to claim 10, wherein the rotor exciting current includes two types of current whose frequencies are different from a frequency of the synchronous current.

13. The synchronous machine according to claim 3, wherein the synchronous machine is linked with wheels of a vehicle in order to generate power to drive the wheels.

14. The synchronous machine according to claim 3, wherein the rotor core is formed to have a radial direction, an axial direction and a circumferential direction and has a plurality of magnet accommodating holes each accommodating a magnet therein, each being embedded near to an outer circumferential surface of the rotor core, and each being axially opened, and soft magnetic beam portions each being adjacently positioned between two of the accommodating holes in the circumferential direction, each supporting and forming the outer circumferential surface of the rotor core, and each allowing magnetic flux to pass, the magnetic flux being produced responsively to the induced alternating current passing through the field winding and interlinking with the armature winding.

15. The synchronous machine according to claim 14, wherein the rotor core has at least one pair of grooves each being axially opened, each being located so as to form a line together with the beam portions, and the magnet accommodating holes in the circumferential direction and locating accommodating therein the field winding.

16. The synchronous machine according to claim 15, wherein each of the beam portions is located between a pair of ones among the magnet accomodating holes, the pair of magnet accommodating poles accomodate a pair of magnets, respectively, being adjacent to each other in the circumferential direction and having the same magnetized direction in the radial direction.

17. The synchronous machine according to claim 16, wherein each of the beam portions is located between each magnet accommodating hole and each groove in the circumferential direction.

18. The synchronous machine according to claim 16, wherein plural beam portions included in the beam portions are located between two grooves composing the one pair of grooves.

19. The synchronous machine according to claim 16, wherein a radially outer-side portion of the rotor core, which has the outer circumferential surface, is formed to be supported by the beam portions, to be extended in the circumferential direction to narrow a radial opening of each of the grooves.

20. The synchronous machine according to claim 3, wherein the fundamental wave component of the armature current has a root-mean-square value higher than ½ of a root-mean-square value of all current, in which half or more of a root-mean-square component of current other than the fundamental wave component resides within a period of time corresponding to ¼ of each phase cycle of the fundamental wave component.

21. The synchronous machine according to claim 20, further comprising an inverter supplying not only the synchronous current to the armature in accordance with a rotation angle of the rotor but also the rotor exciting current, wherein the inverter is configured to decide a phase and an amplitude of the rotor exciting current such that a sum of both a root-mean-square value of the fundamental wave component of the armature current for each phase and a root-mean-square value of the rotor exciting current is equal to or less than a permissible maximum root-mean-square value of the armature current for a predetermined one phase.

22. The synchronous machine according to claim 21, wherein the inverter is configured to mix, of the rotor exciting currents for all the phase, the rotor exciting current having a maximum amplitude, with the armature current for the corresponding phase at a phase or thereabouts other than a peak phase angle for the corresponding phase.

23. The synchronous machine according to claim 22, wherein the inverter is configured to mix, of the rotor exciting currents for all the phase, the rotor exciting current having a maximum amplitude, with the armature current for the corresponding phase during only a period of phase β ranging from a peak phase angle for the corresponding phase to a phase angle α.

24. The synchronous machine according to claim 23, wherein the phase angle α is 0 to 160 degrees and the period of phase β is 0.1 to 60 degrees, and the rotor is composed of a rotor with no permanent magnet embedded therein.

25. The synchronous machine according to claim 23, wherein the phase angle α is 60 to 210 degrees and the period of phase β is 0.1 to 60 degrees, and the rotor is composed of a rotor with permanent magnet embedded therein.

26. The synchronous machine according to claim 3, wherein the rotor has a magnetic salient pole facing an inner circumferential surface of the stator and, at a time instant when the rotor exciting current for each phase shows a peak value thereof, the current supplier is configured to supply the rotor exciting current for each phase producing magnetic flux of which circumferential central position is within a circumferential range occupied by the magnetic salient pole.

27. The synchronous machine according to claim 26, wherein the current supplier is configured to supply the rotor exciting current two times at most during one cycle of the fundamental wave component of the armature current for each phase.

28. The synchronous machine according to claim 26, further comprising an inverter supplying not only the synchronous current to the armature in accordance with a rotation angle of the rotor but also the rotor exciting current for three phases to the alternating current,
wherein the inverter is configured to supply the rotor exciting current for each phase such that, of the rotor exciting currents for the respective three phases, the rotor exciting current for one phase has an amplitude which is substantially double an amplitude of each of the rotor exciting currents for the remaining two phases.

29. The synchronous machine according to claim 3, further comprising an inverter supplying not only the synchronous current to the armature in accordance with a rotation angle of the rotor but also the rotor exciting current for multiphases of the alternating current,
wherein the inverter is configured to generate a rotor exciting voltage to supply the rotor exciting current for each phase.

30. The synchronous machine according to claim 29, wherein the inverter is configured to generate the rotor exciting voltage during a period of time other than timings at which multiphase alternating voltages resulting in the multiphase alternating currents have substantial maximum amplitudes thereof.

31. The synchronous machine according to claim 30, wherein the inverter is configured to generate the rotor exciting voltage for each phase such that a sum of the multiphase alternating voltage for each phase and the rotor exciting voltage for each phase is kept within a maximum amplitude of the multiphase alternating voltage for each phase.

32. The synchronous machine according to claim 30, wherein the inverter is configured to superimpose the rotor exciting voltage for each phase on the multiphase alternating voltage for each phase, the rotor exacting voltages being either pulsed voltages or pulse-width modulated voltages and the multiphase alternating voltages being pulse-width modulated voltages.

33. The synchronous machine according to claim 32, wherein the inverter is configured to superimpose a positive pulse voltage of each rotor exciting voltage on a high-level of the multiphase alternating voltage for each phase and to superimpose a negative pulse voltage of each rotor exciting voltage on a low-level of the multiphase alternating voltage for each phase, both the high-level and the low-level respectively having a deliberately widened period of time.

34. The synchronous machine according to claim 33, wherein the positive pulse voltage and the negative pulse voltage are superposed on the multiphase alternating voltage at a substantial zero-cross point of the multiphase alternating voltage.

35. The synchronous machine according to claim 32, wherein the inverter is configured to superimpose a positive pulse voltage of each rotor exciting voltage on the multiphase alternating voltage for each phase during a positive half-wave period thereof and to superimpose a negative pulse voltage of each rotor exciting voltage on the multiphase alternating voltage for each phase during a negative half-wave period thereof.

* * * * *